(12) United States Patent  
Silvanto et al.

(10) Patent No.: US 11,550,369 B2  
(45) Date of Patent: Jan. 10, 2023

(54) MULTI-PART DEVICE ENCLOSURE

(71) Applicant: Apple Inc., Cupertino, CA (US)

(72) Inventors: Mikael M. Silvanto, San Francisco, CA (US); Simon J. Trivett, Waterloo (CA); Matthew S. Theobald, San Francisco, CA (US); Dinesh C. Mathew, San Francisco, CA (US); Simon R. Lancaster-Larocque, San Jose, CA (US); Robert Y. Cao, San Francisco, CA (US); Ari P. Miller, San Francisco, CA (US); Kevin M. Robinson, Sunnyvale, CA (US); Houtan R. Farahani, Cupertino, CA (US); Francesco Ferretti, Morgan Hill, CA (US); John Raff, Menlo Park, CA (US); Robert J. Lockwood, San Carlos, CA (US); Genie Kim, Sejong (KR); Karan Bir, Bangalore (IN); Keith J. Hendren, San Francisco, CA (US); Gurshan Deol, Santa Clara, CA (US); Antonio Clarke, Cupertino, CA (US); Prabhu Sathyamurthy, Austin, TX (US); William A. Counts, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/158,480

(22) Filed: Jan. 26, 2021

(65) Prior Publication Data

US 2021/0149458 A1 May 20, 2021

Related U.S. Application Data

(63) Continuation of application No. 16/145,019, filed on Sep. 27, 2019, now Pat. No. 10,915,151.

(Continued)

(51) Int. Cl.
*G06F 1/18* (2006.01)
*G06F 1/16* (2006.01)
*H04M 1/02* (2006.01)

(52) U.S. Cl.
CPC ............ *G06F 1/181* (2013.01); *G06F 1/1613* (2013.01); *G06F 1/1616* (2013.01);
(Continued)

(58) Field of Classification Search
None
See application file for complete search history.

(56) References Cited

U.S. PATENT DOCUMENTS

| 4,106,839 A | 8/1978 | Cooper |
| 4,256,412 A | 3/1981 | Tybus et al. |

(Continued)

FOREIGN PATENT DOCUMENTS

| CN | 101087500 | 12/2007 |
| CN | 102159045 | 8/2011 |

(Continued)

OTHER PUBLICATIONS

Author Unknown, "Improved Touchscreen Products," Research Disclosure, Kenneth Mason Publications, Hampshire, UK, GB, vol. 428, No. 53, Dec. 1, 1999.

(Continued)

*Primary Examiner* — Xanthia C Cunningham
(74) *Attorney, Agent, or Firm* — Brownstein Hyatt Farber Schreck, LLP

(57) ABSTRACT

An electronic device includes an enclosure formed of a plurality of layers cooperating to define an interior volume. The enclosure includes a first layer formed of a first material and defining a user input surface of the enclosure and a first portion of a side surface of the enclosure. The enclosure also includes a second layer, formed of a second material differ- (Continued)

ent from the first material, positioned below the first layer and defining a second portion of the side surface of the enclosure. The enclosure also includes a third layer, formed of a third material different from the first and second materials, positioned below the second layer and defining a bottom surface of the enclosure and a third portion of the side surface of the enclosure.

20 Claims, 24 Drawing Sheets

Related U.S. Application Data

(60) Provisional application No. 62/566,081, filed on Sep. 29, 2017.

(52) U.S. Cl.
CPC .......... *G06F 1/1637* (2013.01); *G06F 1/1652* (2013.01); *G06F 1/183* (2013.01); *H04M 1/0202* (2013.01); *H04M 1/0249* (2013.01)

(56) References Cited

U.S. PATENT DOCUMENTS

| | | | |
|---|---|---|---|
| 4,855,174 A | 8/1989 | Kamamoto et al. |
| 4,989,622 A | 2/1991 | Kozuka et al. |
| 5,055,347 A | 10/1991 | Bacon, Jr. |
| 5,512,374 A | 4/1996 | Wallace et al. |
| 6,061,104 A | 5/2000 | Evanicky et al. |
| 6,093,887 A | 7/2000 | Ponto et al. |
| 6,189,938 B1 | 2/2001 | Nakadaira et al. |
| 6,288,330 B1 | 9/2001 | Chen |
| 6,359,768 B1 | 3/2002 | Eversley et al. |
| 6,392,873 B1 | 5/2002 | Honda |
| 6,424,338 B1 | 7/2002 | Anderson et al. |
| 6,442,826 B1 | 9/2002 | Staudt et al. |
| 6,473,069 B1 | 10/2002 | Gerpheide |
| 6,483,024 B1 | 11/2002 | Smithson et al. |
| 6,589,891 B1 | 7/2003 | Rast |
| 6,654,256 B2 | 11/2003 | Gough |
| 6,671,160 B2 | 12/2003 | Hayden |
| 6,940,731 B2 | 9/2005 | Davis et al. |
| 6,996,425 B2 | 2/2006 | Watanabe |
| 7,048,242 B2 | 5/2006 | Oddsen, Jr. |
| 7,436,653 B2 | 10/2008 | Yang et al. |
| 7,491,900 B1 | 2/2009 | Peets et al. |
| 7,586,753 B2 | 9/2009 | Lu |
| 7,604,377 B2 | 10/2009 | Yu et al. |
| 7,755,913 B2 | 7/2010 | He |
| 7,829,812 B2 | 11/2010 | Tolbert et al. |
| 7,920,904 B2 | 4/2011 | Kim et al. |
| 7,986,525 B2 | 7/2011 | Wang |
| 8,066,233 B2 | 11/2011 | Fujikawa et al. |
| 8,092,897 B2 | 1/2012 | Honma et al. |
| 8,101,859 B2 | 1/2012 | Zadesky |
| 8,164,898 B2 | 4/2012 | Lin et al. |
| D660,193 S | 5/2012 | Neuner |
| 8,195,244 B2 | 6/2012 | Smoyer et al. |
| 8,199,488 B2 | 6/2012 | Zou et al. |
| 8,358,513 B2 | 1/2013 | Kim et al. |
| 8,396,521 B2 | 3/2013 | Horimoto et al. |
| 8,456,847 B2 | 6/2013 | Hwang et al. |
| 8,509,863 B2 | 8/2013 | Vedurmudi et al. |
| 8,553,907 B2 | 10/2013 | Thomason et al. |
| 8,558,977 B2 | 10/2013 | Gettemy et al. |
| 8,587,935 B2 | 11/2013 | Lee |
| 8,654,524 B2 | 2/2014 | Pance et al. |
| 8,665,236 B2 | 3/2014 | Myers |
| 8,675,359 B2 | 3/2014 | Chen |
| 8,681,115 B2 | 3/2014 | Kurita |
| 8,744,529 B2 | 6/2014 | Freund et al. |
| 8,773,848 B2 | 7/2014 | Russell-Clarke et al. |
| 8,824,140 B2 | 9/2014 | Prest et al. |
| 8,974,924 B2 | 3/2015 | Weber et al. |
| 8,975,540 B2 | 3/2015 | Mareno et al. |
| 9,007,748 B2 | 4/2015 | Jarvis |
| 9,086,748 B2 | 7/2015 | Nam et al. |
| 9,124,676 B2* | 9/2015 | Allore ................. H04M 1/0202 |
| 9,135,944 B2 | 9/2015 | Jenks |
| 9,162,519 B2 | 10/2015 | Suehiro et al. |
| 9,173,306 B2* | 10/2015 | Lim .................... H04M 1/0216 |
| 9,203,463 B2 | 12/2015 | Asrani et al. |
| 9,218,116 B2 | 12/2015 | Benko et al. |
| 9,250,659 B2 | 2/2016 | Tsai et al. |
| 9,390,869 B2 | 7/2016 | Lee et al. |
| 9,429,997 B2 | 8/2016 | Myers et al. |
| 9,448,631 B2 | 9/2016 | Winter et al. |
| 9,489,054 B1 | 11/2016 | Sumsion et al. |
| 9,532,723 B2 | 1/2017 | Kim et al. |
| 9,621,218 B1 | 4/2017 | Glickman et al. |
| 9,642,241 B2 | 5/2017 | Huitema et al. |
| 9,654,164 B2 | 5/2017 | Irci et al. |
| 9,740,237 B2 | 8/2017 | Moore et al. |
| 9,804,635 B2 | 10/2017 | Kim et al. |
| 9,826,649 B2 | 11/2017 | Narajowski et al. |
| 9,898,903 B2 | 2/2018 | Khoshkava et al. |
| 9,955,603 B2 | 4/2018 | Kiple et al. |
| 10,013,075 B2 | 7/2018 | Shipman |
| 10,042,442 B2 | 8/2018 | Kwak |
| 10,110,267 B2 | 10/2018 | Kim et al. |
| 10,321,590 B2 | 6/2019 | Cater et al. |
| 10,424,765 B2 | 9/2019 | Hwang et al. |
| 10,468,753 B2 | 11/2019 | Kim et al. |
| 10,656,714 B2 | 5/2020 | Ligtenberg et al. |
| 10,705,570 B2 | 7/2020 | Kuna et al. |
| 11,379,010 B2 | 7/2022 | Kuna et al. |
| 2002/0006687 A1 | 1/2002 | Lam |
| 2002/0072335 A1 | 6/2002 | Watanabe |
| 2002/0130981 A1 | 9/2002 | Ma et al. |
| 2004/0190239 A1 | 9/2004 | Weng |
| 2005/0140565 A1 | 6/2005 | Krombach |
| 2006/0203124 A1 | 9/2006 | Park et al. |
| 2007/0195495 A1 | 8/2007 | Kim et al. |
| 2007/0229702 A1 | 10/2007 | Shirono et al. |
| 2007/0287512 A1 | 12/2007 | Kilpi et al. |
| 2008/0084384 A1 | 4/2008 | Gregorio et al. |
| 2008/0174037 A1 | 7/2008 | Chen |
| 2008/0176609 A1* | 7/2008 | Kim ....................... H04M 1/035 |
| | | 455/575.1 |
| 2009/0041984 A1 | 2/2009 | Mayers et al. |
| 2010/0105452 A1* | 4/2010 | Shin ..................... H04B 1/3838 |
| | | 455/575.8 |
| 2010/0137043 A1 | 6/2010 | Horimoto et al. |
| 2010/0151925 A1 | 6/2010 | Vedurmudi et al. |
| 2010/0157515 A1* | 6/2010 | Tseng .................. H05K 5/0217 |
| | | 361/679.02 |
| 2010/0265182 A1 | 10/2010 | Ball et al. |
| 2010/0302016 A1 | 12/2010 | Zaborowski et al. |
| 2010/0315399 A1 | 12/2010 | Jacobson et al. |
| 2011/0047459 A1 | 2/2011 | Van Der Westhuizen |
| 2011/0065479 A1 | 3/2011 | Nader |
| 2011/0095994 A1 | 4/2011 | Birnbaum |
| 2011/0205169 A1 | 8/2011 | Yasutake et al. |
| 2012/0088072 A1 | 4/2012 | Pawloski et al. |
| 2012/0175165 A1 | 7/2012 | Merz et al. |
| 2012/0212424 A1 | 8/2012 | Sharma et al. |
| 2012/0236477 A1 | 9/2012 | Weber |
| 2012/0268412 A1 | 10/2012 | Cruz-Hernandez et al. |
| 2013/0040711 A1* | 2/2013 | Kim ....................... H01H 15/005 |
| | | 455/575.1 |
| 2013/0051000 A1 | 2/2013 | Yu et al. |
| 2013/0273295 A1 | 10/2013 | Kenney et al. |
| 2013/0308282 A1* | 11/2013 | Shin ........................ H05K 7/14 |
| | | 361/748 |
| 2014/0015773 A1 | 1/2014 | Loeffler |
| 2014/0347799 A1 | 11/2014 | Ono et al. |
| 2014/0368455 A1 | 12/2014 | Croisonnier et al. |
| 2015/0062419 A1 | 3/2015 | Hooton et al. |
| 2015/0090571 A1 | 4/2015 | Leong et al. |
| 2015/0109223 A1 | 4/2015 | Kessler et al. |
| 2015/0124401 A1 | 5/2015 | Prest et al. |
| 2015/0171916 A1 | 6/2015 | Asrani et al. |

(56) References Cited

U.S. PATENT DOCUMENTS

| | | |
|---|---|---|
| 2015/0183185 A1 | 7/2015 | Chang |
| 2015/0185946 A1 | 7/2015 | Fourie |
| 2015/0255853 A1 | 9/2015 | Kwong et al. |
| 2016/0064820 A1 | 3/2016 | Kim et al. |
| 2016/0098107 A1 | 4/2016 | Morrell et al. |
| 2016/0103544 A1 | 4/2016 | Filiz et al. |
| 2016/0147257 A1 | 5/2016 | Yamazaki |
| 2016/0270247 A1 | 9/2016 | Jones et al. |
| 2016/0308563 A1 | 10/2016 | Ouyang et al. |
| 2016/0316574 A1* | 10/2016 | Chang ................ G06F 1/1626 |
| 2016/0327980 A1 | 11/2016 | Farahani et al. |
| 2016/0327986 A1 | 11/2016 | Farahani et al. |
| 2017/0010771 A1 | 1/2017 | Bernstein et al. |
| 2017/0038793 A1 | 2/2017 | Kallman |
| 2017/0048495 A1 | 2/2017 | Scalisi et al. |
| 2017/0230073 A1* | 8/2017 | Youn ................ H04B 1/3888 |
| 2017/0264722 A1* | 9/2017 | Zhong ............... H04M 1/0266 |
| 2018/0020208 A1 | 1/2018 | Woo et al. |
| 2018/0026353 A1 | 1/2018 | Tseng et al. |
| 2018/0077328 A1 | 3/2018 | Park et al. |
| 2018/0210515 A1 | 7/2018 | Lyles et al. |
| 2018/0213660 A1 | 7/2018 | Prest et al. |
| 2018/0217668 A1 | 8/2018 | Ligtenberg et al. |
| 2018/0217669 A1 | 8/2018 | Ligtenberg et al. |
| 2018/0284845 A1 | 10/2018 | Honma et al. |
| 2019/0101960 A1 | 4/2019 | Silvanto et al. |
| 2019/0128669 A1 | 5/2019 | Nobayashi et al. |
| 2019/0361543 A1 | 11/2019 | Zhang |
| 2019/0377385 A1 | 12/2019 | Bushnell |
| 2020/0057525 A1 | 2/2020 | Prest et al. |
| 2020/0076056 A1 | 3/2020 | Froese et al. |
| 2020/0076057 A1 | 3/2020 | Leutheuser et al. |
| 2020/0076058 A1 | 3/2020 | Zhang et al. |
| 2020/0278747 A1 | 9/2020 | Ligtenberg et al. |
| 2020/0409023 A1 | 12/2020 | Kazuo et al. |
| 2021/0149458 A1 | 5/2021 | Silvanto et al. |
| 2021/0234403 A1 | 7/2021 | Ku et al. |
| 2021/0353226 A1 | 11/2021 | Hiemstra et al. |
| 2022/0006176 A1 | 1/2022 | Froese et al. |
| 2022/0057885 A1 | 2/2022 | Prest et al. |
| 2022/0059928 A1 | 2/2022 | Leutheuser et al. |

FOREIGN PATENT DOCUMENTS

| | | |
|---|---|---|
| CN | 202281978 | 6/2012 |
| CN | 102984904 | 3/2013 |
| CN | 103168280 | 6/2013 |
| CN | 203054674 | 7/2013 |
| CN | 103390793 | 11/2013 |
| CN | 203416294 | 1/2014 |
| CN | 103681061 | 3/2014 |
| CN | 104742308 | 7/2015 |
| CN | 105228966 | 1/2016 |
| CN | 107221506 | 9/2017 |
| CN | 107275751 | 10/2017 |
| CN | 107735903 | 2/2018 |
| CN | 207216299 | 4/2018 |
| CN | 108400425 | 8/2018 |
| CN | 108594622 | 9/2018 |
| CN | 108594623 | 9/2018 |
| CN | 112532263 | 3/2021 |
| CN | 112799294 | 5/2021 |
| EP | 2565742 | 3/2013 |
| EP | 2843501 | 3/2015 |
| EP | 2993730 | 3/2016 |
| EP | 3144768 | 3/2017 |
| EP | 3438786 | 2/2019 |
| GB | 2516439 | 1/2015 |
| GB | 2529885 | 3/2016 |
| JP | S58151619 | 9/1983 |
| JP | H61039144 | 2/1986 |
| JP | H10102265 | 4/1998 |
| JP | H63249697 | 10/1998 |
| JP | 2001216077 | 8/2001 |
| JP | 20023431 | 11/2002 |
| JP | 2004272690 | 9/2004 |
| JP | 2006243812 | 9/2006 |
| JP | 2007072375 | 3/2007 |
| JP | 2011014149 | 1/2011 |
| JP | 2011159276 | 8/2011 |
| JP | 2011239139 | 11/2011 |
| JP | 2011248888 | 12/2011 |
| JP | 2012027592 | 2/2012 |
| JP | 2012222553 | 11/2012 |
| JP | 2013508818 | 3/2013 |
| JP | 2014501070 | 1/2014 |
| JP | 2014512879 | 5/2014 |
| JP | 2014186075 | 10/2014 |
| JP | 2015031952 | 2/2015 |
| KR | 20110049416 | 5/2011 |
| KR | 20130096048 | 8/2013 |
| KR | 20150012312 | 2/2015 |
| KR | 20160019833 | 2/2016 |
| KR | 20160052275 | 5/2016 |
| KR | 20160134504 | 11/2016 |
| TW | 201129285 | 8/2011 |
| TW | 201532835 | 9/2015 |
| TW | 201701119 | 1/2017 |
| WO | WO2009/002605 | 12/2008 |
| WO | WO2009/049331 | 4/2009 |
| WO | WO2009/129123 | 10/2009 |
| WO | WO2012/129247 | 9/2012 |
| WO | WO2014/037945 | 3/2014 |
| WO | WO2015/153701 | 10/2015 |
| WO | WO2016/039803 | 3/2016 |
| WO | WO2016/053901 | 4/2016 |
| WO | WO2018/013573 | 1/2018 |
| WO | WO2018/142132 | 8/2018 |

OTHER PUBLICATIONS

Kim et al., "Ultrathin Cross-Linked Perfluoropolyether Film Coatings from Liquid $CO_2$ and Subsequent UV Curing," Chem. Matter, vol. 22, pp. 2411-2413, 2010.

International Search Report and Written Opinion, PCT/US2018/024870, 16 pages, dated Sep. 19, 2018.

Author Unknown, "Smart Watch—New Fashion Men/women Bluetooth Touch Screen Smart Watch Wrist Wrap Watch Phone," https://www.fargoshopping.co.ke/, 5 pages, Mar. 2016.

* cited by examiner

MULTI-PART DEVICE ENCLOSURE

CROSS-REFERENCE TO RELATED APPLICATION(S)

This application is a continuation patent application of U.S. patent application Ser. No. 16/145,019, filed Sep. 27, 2018 and titled "Multi-Part Device Enclosure," which is a nonprovisional patent application of and claims the benefit of U.S. Provisional Patent Application No. 62/566,081, filed Sep. 29, 2017 and titled "Multi-Part Device Enclosure," the disclosures of which are hereby incorporated herein by reference in their entireties.

FIELD

The described embodiments relate generally to electronic devices, and more particularly to electronic devices with multi-part enclosures.

BACKGROUND

Modern consumer electronic devices take many shapes and forms, and have numerous uses and functions. Smartphones, notebook computers, and tablet computers, for example, provide various ways for users to interact with other people, as well as access information, work, play games, and so forth. Such devices use enclosures to house delicate electrical components, allow a user to easily handle and use the device, and to provide a desired shape, form factor, and overall appearance of the device. Enclosures for electronic devices may be formed in various ways and using various materials. For example, enclosures may be formed of plastic or metal.

SUMMARY

An electronic device includes an enclosure formed of a plurality of layers cooperating to define an interior volume. The enclosure includes a first layer formed of a first material and defining a user input surface of the enclosure and a first portion of a side surface of the enclosure. The enclosure also includes a second layer, formed of a second material different from the first material, positioned below the first layer and defining a second portion of the side surface of the enclosure. The enclosure also includes a third layer, formed of a third material different from the first and second materials, positioned below the second layer and defining a bottom surface of the enclosure and a third portion of the side surface of the enclosure. The first layer may include a transparent region, and the electronic device may further include a display positioned below the first layer and aligned with the transparent region of the first layer. The side surface may define a curved surface along at least the second portion of the side surface and the third portion of the side surface.

The electronic device may further include a fourth layer between the first layer and the second layer and defining a fourth portion of the side surface of the enclosure. The electronic device may further include an electronic assembly within the interior volume and having a non-planar side profile. The second layer and the fourth layer may cooperate to define a non-planar interior wall of the interior volume that conforms to the non-planar side profile of the electronic assembly. The fourth layer may be formed of a fourth material different from the first, second, and third materials. The electronic device may further include a fifth layer defining a fifth portion of the side surface of the enclosure, and a sixth layer defining a sixth portion of the side surface of the enclosure. The fifth and sixth layers of the enclosure may cooperate with the second and fourth layers to define the non-planar interior wall of the interior volume that conforms to the non-planar side profile of the electronic assembly.

An electronic device may include a top layer defining a top surface of the electronic device, and a first portion of a side surface of the electronic device. The electronic device may also include an electrically operative layer positioned below the top layer and defining a second portion of the side surface of the electronic device, and a bottom layer positioned below the electrically operative layer and defining a bottom surface of the electronic device, and a third portion of the side surface of the electronic device. The top layer may include an opening in the top surface, and the electronic device may include a button mechanism positioned in the opening. The button mechanism may include a dome switch coupled to the an electrically operative layer. The first, second, and third portions of the side surface may extend around an entire periphery of the electronic device.

The electronic device may further include a reinforcing layer attached to the top layer and defining an additional portion of the side surface of the electronic device between the top layer and the an electrically operative layer. The reinforcing layer may include carbon fiber. The top layer may be formed of a material selected from aluminum, stainless steel, plastic, sapphire, glass, or carbon fiber.

An electronic device may include a display portion including a display enclosure and a display within the display enclosure. The electronic device may also include a base portion rotatably coupled to the display portion and including a top case defining a top surface of the base portion and a first portion of a side surface of the base portion. The base portion may also include a first intermediate layer, having a first thickness, positioned below the top case and defining a second portion of the side surface of the base portion, a second intermediate layer, having a second thickness different than the first thickness, positioned below the first intermediate layer and defining a third portion of the side surface of the base portion, and a bottom case. The bottom case may define a bottom surface of the base portion and a fourth portion of the side surface of the base portion.

The display portion may further include a transparent cover defining a front surface of the display portion and a first portion of a side surface of the display portion. The display portion may further include an intermediate layer between the transparent cover and the back layer and defining a second portion of the side surface of the display portion. The back layer may define a back surface of the display portion, and a third portion of the side surface of the display portion.

The intermediate layer may be a polarizer layer of the display. The first and second intermediate layers may be formed of different materials. The second intermediate layer may include a substrate and a conductive trace integrated with the substrate.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
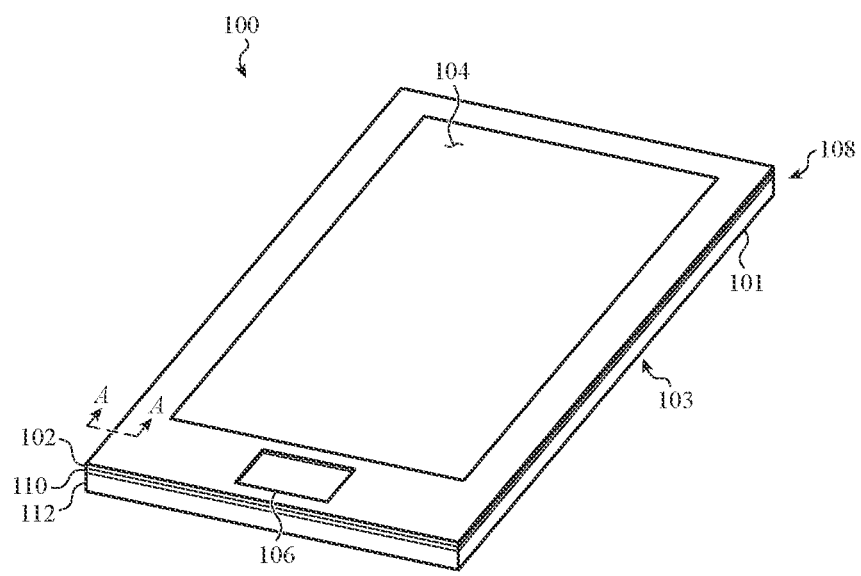
FIG. 1 depicts an example electronic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The embodiments described herein are generally directed to electronic device enclosures that include multiple layers that cooperate to form the exterior surfaces of the enclosures. The layers that form the exterior surfaces of an enclosure (e.g., top, bottom, and side surfaces) may be more than just housing components, but may also be functional components of the electronic device. For example, in conventional electronic device enclosures (e.g., for smartphones, tablet computers, wearable electronic devices such as smartwatches, notebook computers, etc.), internal components such as circuit boards, display components, keyboard substrates, touch- and/or force-sensing components and the like are all substantially enclosed in an interior cavity of a metal or plastic housing. Embodiments described herein, by contrast, use such components to perform their traditional functions, as well as to form exterior surfaces (or portions thereof) of an electronic device enclosure.

In such cases, multiple functional components of an electronic device (e.g., enclosure members, circuit boards, display components, keyboard or keypad substrates, and the like) may be layered in such a way that the peripheral sides of these components cooperate to define the side surfaces of the enclosure of the electronic device. This construction technique may have several advantages. For example, the laminate structure may be strong and stiff, thereby producing a robust and durable electronic device. Further, as the functional components also form the physical structure of the enclosure, additional shells, covers, frames, or other conventional housing components may be omitted. Also, complex geometries can be formed without machining or other material removal operations by effectively building the geometries one layer at a time. Finally, the layered or laminate-style construction may result in a side surface in which each individual layer is visually distinct, producing a visually appealing appearance to the device.

As used herein, an enclosure may refer to a component (or components) of a device that define one or more exterior surfaces of the device and also define one or more interior cavities in which components of the electronic device are enclosed. Accordingly, while the electronic devices described herein may use functional components of the device (e.g., circuit boards, display layers, etc.) to define at least part of its outer or exterior surfaces, it will be understood that those components may define or form the enclosure of the device while also performing other functions, such as electrical functions, computing functions, display functions, input functions, or the like. Moreover, it will be understood that an enclosure need not be a separate housing component (such as a plastic or metal shell), but may be formed of multiple components that are not conventionally used to define the exterior surfaces of the device.

FIG. 1 shows an electronic device 100 that may include an enclosure formed of multiple layers of functional components, as described above. While the device 100 resembles a smartphone, this is merely one example of an electronic device for which the enclosure construction described herein may be used. Accordingly, it will be understood that the techniques, concepts, and principles described herein with reference to the device 100 are applicable to other devices, such as wearable electronic devices (e.g., smart watches, heart rate monitors, biometric sensors), desktop computers, notebook computers, tablet computers, head-mounted displays, and the like.

The device 100 includes an enclosure 101 that defines exterior surfaces of the device 100, including a top surface 104, a bottom surface 103, and side surfaces 108. The side surfaces 108 may extend from the top surface 104 to the bottom surface 103, and may define the height of the enclosure 101 (as well as the overall height of the device 100). As the top surface 104 may include input devices such as touch- and/or force-sensitive displays, buttons, keyboards, trackpads, touch sensors, etc., the top surface 104 may also be referred to herein as an input surface.

The device 100 may include a transparent cover 102 (e.g., a first layer) that covers or otherwise overlies a display, and may define a front face and an input surface 104 of the electronic device 100. For example, a user may operate the device 100 by touching the input surface 104 to select affordances displayed on the display. The transparent cover 102 may have a transparent region that overlies and is aligned with the display, and opaque or masked regions surrounding the transparent region. The masked or opaque region may cover and obscure internal components of the device, and may visually define the outer boundary and/or shape of the visible portion of the display.

The electronic device 100 may also include a button 106. The button 106 may be movable, such as a mechanical push-button or key, or it may be substantially rigid. In either case, the button 106 may be used to control an operation of the device 100 or otherwise cause the device 100 to perform various functions. The button 106 (or a component of the button 106) may be positioned in an opening or aperture in the cover 102.

The electronic device 100 may also include touch- and/or force-sensing systems associated with the cover 102. Touch- and/or force-sensing systems may include electrode layers (e.g., substrates with electrical traces thereon) that are coupled to touch- and/or force-sensing circuitry to detect electrical changes (e.g., capacitive, resistive, inductive, etc.) due to the proximity or contact of a user's finger or other implement. These components, along with the display that is positioned below the transparent cover 102, produce an input surface 104 that may accept various types of physical inputs, such as swipes, gestures, touch inputs, presses (e.g., touch inputs applied to the cover 102 that are above a threshold pressure or force), and the like. Where the device 100 includes touch- and/or force-sensing systems, components of those systems may be positioned below the cover 102. In some cases, they may be attached to a bottom surface the cover 102, or otherwise below the cover 102.

In some cases, the device 100 may also include a keypad or keyboard. The keypad may include a plurality of buttons, keys or other input mechanisms. The keypad may be provided in addition to a touch- and/or force-sensitive input devices on a front or top surface of the device 100 (e.g., on a user-interface surface). A keypad may include a substrate, such as a circuit board, on which components of key or button mechanisms may be applied. For example, a keypad substrate may be a printed circuit board on which dome switches or other electrical switching components may be electrically coupled. Other components of button mechanisms may be applied to the keypad substrate, such as button support mechanisms, switch housings, light sources (e.g., for illuminating button glyphs, etc.). In some cases, a keypad may include multiple substrates, such as a printed circuit board, to which electrical components of the button mechanisms may be attached, and a support plate, to which mechanical components of the button mechanisms may be attached. A keypad may also include other components or layers, such as membranes, fabric covers, light guide layers, or the like. As described herein, any of the substrates or layers of a keypad may extend to and define a portion of a side surface of the enclosure of the device 100.

The enclosure 101 of the device 100 (e.g., the components that define one or more exterior surfaces of the device 100) may be formed at least partially of functional, electrically operative components of the device. More particularly, components of the device that contribute to the electrical and/or computing functions of the device, such as display components, circuit boards, etc., may extend to the periphery of the device 100 and define portions of a side surface 108 of the device enclosure. FIG. 1 shows an example in which three layers or components define the exterior side surface of the device 100. For example, the transparent cover 102 may define a user input surface 104 of the device 100, as well as a first portion of the side surface 108 of the enclosure. A second layer 110 may be positioned below the transparent cover 102 and above an underlying third layer 112 (which may form a back surface of the device 100). The second layer 110 may be any component or component(s), including an electrically operative layer such as a printed circuit board, a display component, a touch- and/or force-sensing layer (e.g., a flex circuit substrate with electrodes deposited thereon), or the like. Where the second layer 110 is a circuit board, it may have various components attached thereto, such as processors, memory, dome switches or other switching mechanisms (e.g., for the button 106 or buttons or keys of a keypad), haptic actuators, or the like. Both the second layer 110 and the third layer 112 also define portions of the side surface 108 of the enclosure. Further, as described above, the cover 102 and the second and third layers 110, 112 (and any additional layers that may define the side of the device) extend around an entire periphery of the device 100.

The transparent cover 102, the second layer 110, and the third layer 112 may be formed from different materials, thus producing a side surface of the device 100 having layers of contrasting materials. For example, the transparent cover 102 may be formed from glass, while the second layer 110 may be formed from a glass-reinforced polymer or a plastic, and the third layer 112 may be formed from metal. Other materials and combinations of materials are also contemplated. Example materials for any given layer include metal, plastic, carbon fiber, glass, sapphire, ceramic, or the like. In some cases, the layers are symmetrically stacked, such that the first and third layers are one material, and the second layer is another material. This symmetrical arrangement may also be present in enclosures that use more than three layers. For example, in a five layer enclosure, the first and fifth layers may be formed from a first material, and the second and fourth layers may be formed from a second material (different from the first material), and the third layer may be a third material (which may be different from at least the second material, and optionally different from the first material).

The transparent cover 102, the second layer 110, and the third layer 112 (as well as any optional additional layers) may have side surfaces of any suitable thicknesses. For example, in some cases, the side surfaces of each layer are substantially the same, while in other cases the side surfaces of each layer are different. In yet other cases, some of the layers have the same thickness while others have different thicknesses. The thicknesses of the layers may range from about 100 microns (e.g., in the case of a film or ink layer that is exposed along the side surface of the device 100), to 5 mm or 10 mm (e.g., in the case of a shell or housing component that includes a peripheral wall that defines part of an internal cavity). Layers of different thicknesses are also contemplated.

Figure 2:
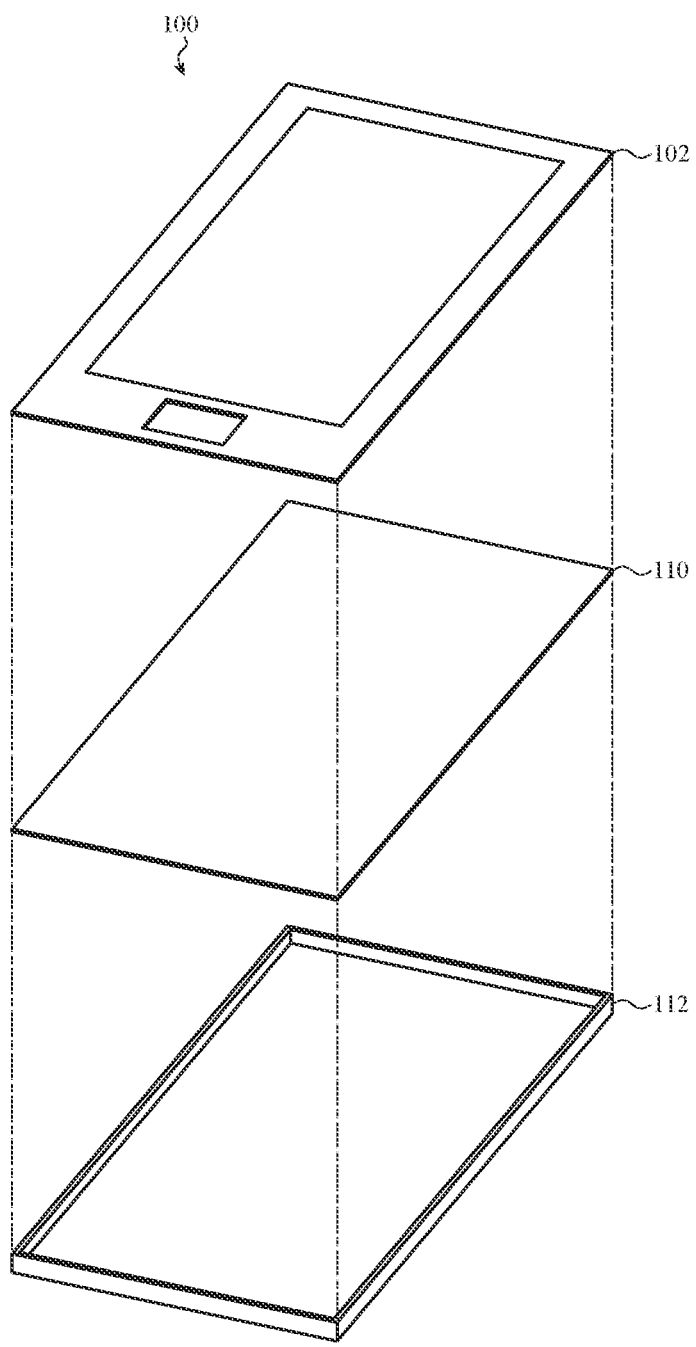
FIG. 2 depicts a simplified exploded view of the electronic device of FIG. 1.

FIG. 2 shows an exploded view of the device 100, showing the cover 102 (e.g., the first or top layer) and the second layer 110 separated from the third layer 112. As shown, the second layer 110 may extend the full length and width of the device 100, such that its side surfaces are exposed along and define a portion of the side surface of the device 100. The second layer 110 may be an electrically operative layer (e.g., a circuit board, one or more display layers, an antenna, etc.), a stiffening or reinforcing member, a battery layer, or any other suitable component. The third layer 112 may include a peripheral wall that defines a portion of the side surface of the device 100 and also defines the sides of an internal cavity (cavity 304, FIG. 3A) in which components of the device 100 may be positioned. Such components may include, for example, a battery, processor, circuit board, memory, hard drive, antennas, cameras (which may be aligned with openings in the device 100), environmental sensors (e.g., accelerometers, barometric sensors), biometric sensors (e.g., heart rate sensors), and the like.

FIGS. 3A-3E are partial cross-sectional views of example electronic device enclosures, viewed along line A-A in FIG. 1, showing various configurations of layers and side shapes of an electronic device (or other electronic device using the construction technique described herein). While the partial cross-sections shown in these figures are viewed at one particular location on a device or enclosure, these cross-sections may be representative of substantially an entire peripheral region of the device. For example, because the components forming the side surface of the device are layers that may extend to the perimeter of the device (e.g., they extend edge-to-edge), the same cross-section may exist at all (or most) locations around the periphery of the device. In some cases, the side surface may have openings formed therein, such as for speakers, microphones, charging ports, electrical/communication connectors (e.g., universal serial bus (USB) ports), heat sinks, cooling fans, disk drives, or other devices. In such cases, the cross-sections in those areas may differ from those shown herein, and the seams between layers may be broken or discontinuous at the openings. Apart from these discontinuities, the layered appearance and construction (e.g., the seams, the side surfaces of each layer, etc.) may extend around substantially the entire periphery of the device. In some cases, the seams and/or sides of the layers extend around more than 80%, more than 90%, or more than 95% of the periphery of the device.

Where a device includes openings in a side surface, the openings may be integrally formed with one or more layers of the enclosure. For example, a layer may include an opening or gap along a segment of the layer that otherwise forms a portion of the side of the enclosure. The opening may be aligned with a component (e.g., a charging port, speaker, etc.) to facilitate the function of the component. In some cases, the opening may define a serpentine pattern through the layer. For example, a speaker or microphone opening (or pressure relief opening) may not be defined by a single linear opening extending perpendicularly through the layer. Rather, the opening may be defined by a first aperture opening to the exterior of the enclosure, a second aperture offset from the first aperture and opening to the interior cavity of the enclosure, and a channel through the material of the layer and connecting the first and second apertures along a path that is not perpendicular to the exterior surface. In this way, a path from the outside of the device to the inside of the device may be formed without visually or otherwise directly exposing an internal component through an opening in the housing.

Figure 3A:
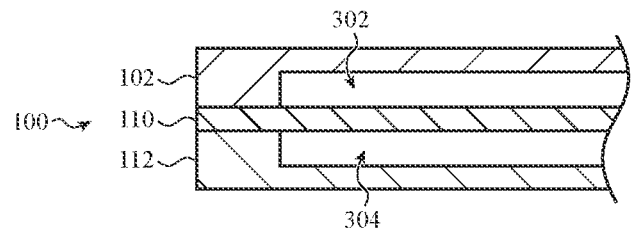
FIGS. 3A-3E depict partial cross-sectional views of various example electronic devices.

FIG. 3A shows a partial cross-section of the device 100 shown in FIGS. 1-2. In particular, FIG. 3A shows the cover 102 (e.g., a first layer), the second layer 110 (e.g., an electrically operative layer, a circuit board, display component, or the like), and the third layer 112 (e.g., an enclosure component), all having exposed side surfaces that form part of the side surface of the device 100. FIG. 3A also shows how the cover 102 may define a cavity 302 in which components associated with a display and touch- and/or force-sensitive components may be positioned. For example, a display module, including a light source, polarizers, filters, light diffusers, liquid crystals, light emitting diodes (LEDs), organic light emitting diodes (OLEDs) or other components may be positioned within the cavity 302 and optionally coupled to the cover 102. Where a display module is positioned in the cavity 302, the second layer 110 may be a circuit board, mounting plate, or other component that provides electrical and/or computing functionality to the device 100.

Figure 3B:
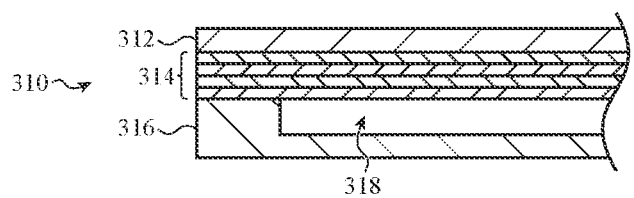

FIG. 3B shows a partial cross sectional view of another example device 310 (which may be an embodiment of the device 100) in which the layered components of the device define portions of the side surface of the device 310. The device 310 may include a transparent cover 312 (e.g., a first layer) and a display stack 314 (e.g., a second or intermediate layer) below the transparent cover 312 and above a bottom portion 316 (e.g., a third layer). The display stack 314 may be attached to the transparent cover 312, or below the transparent cover 312 without interstitial layers.

The display stack 314 may include multiple individual layers, some or all of which may provide an optical function to facilitate the operation of the display. For example, the display stack 314 may include optical filters, polarizers, light guide layers, liquid crystal layers, LED layers. While the display stack 314 is shown as having four layers of equal thickness, this is merely one example configuration, and more or fewer layers (and layers of different sizes) may be used in a display stack. As shown, however, the layers of the display stack 314 extend to the outermost side of the device 310 and define a portion of the side surface of the device 310. In some cases, less than all of the layers or components of a display stack are exposed on the side surface of a device.

Because the display stack 314 extends to the outermost side of the device 310, it may not be necessary for the transparent cover 312 to have a cavity or recess to accommodate a display module. However, the bottom portion 316 may define a cavity 318, similar to the cavity 304 in FIG. 3A, in which components of the device 310 may be positioned. Such components may include, for example, a battery, processor, circuit board, memory, hard drive, antennas, cameras (which may be aligned with openings in the device 310), environmental sensors (e.g., accelerometers, barometric sensors), biometric sensors (e.g., heart rate sensors), and the like.

Figure 3C:
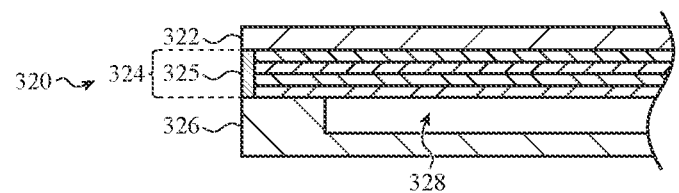

FIG. 3C shows a partial cross sectional view of another example device 320 (which may be an embodiment of the device 100) in which the layered components of the device define portions of the side surface of the device 320. The device 320 may include a transparent cover 322 (e.g., a first layer) and a display stack 324 (e.g., a second or intermediate layer) below the transparent cover 322 and above a bottom portion 326 (e.g., a third layer). The display stack 324 may be attached to the transparent cover 322, or below the transparent cover 322 without interstitial layers. The bottom portion 326 may also define an internal cavity 328, similar to the cavity 304 in FIG. 3A, in which components of the device 320 may be positioned. Such components may include, for example, a battery, processor, circuit board, memory, hard drive, antennas, cameras (which may be aligned with openings in the device 320), environmental sensors (e.g., accelerometers, barometric sensors), biometric sensors (e.g., heart rate sensors), and the like.

The display stack 324 may include multiple individual layers, some or all of which may provide an optical function to facilitate the operation of the display. For example, the display stack 324 may include optical filters, polarizers, light guide layers, liquid crystal layers, LED layers, or the like. Whereas the side surfaces of the components in the display stack 314 of FIG. 3B are exposed and each define a portion of the side surface of the device, the side surfaces of the components in the display stack 324 are covered or encapsulated by a covering 325. The covering 325 may seal and/or otherwise protect the components of the display stack 324 from delamination or other damage that may occur if such components are not suitably strong or resistant to damage during normal use of the device 320. The covering 325 may be transparent so that each layer is visible and visually distinct from the adjacent layers, thus providing a visual appearance similar to that of the device 310. In other cases, the covering 325 may be opaque. The covering 325 may be any suitable material, including but not limited to epoxy, plastic, glass, adhesive, ink, one or more films, or the like.

Figure 3D:
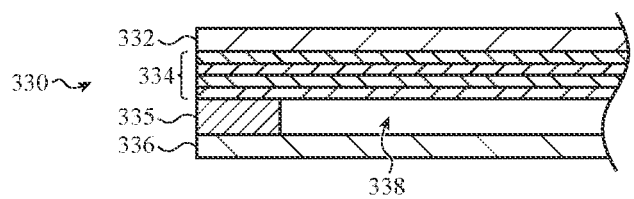

FIG. 3D shows a partial cross sectional view of another example device 330 (which may be an embodiment of the device 100) in which the layered components of the device define portions of the side surface of the device 330. The device 330 may include a transparent cover 332 (e.g., a first layer) and a display stack 334 (e.g., a second or intermediate layer) below the transparent cover 332 and above a bottom portion 336 (e.g., a third layer). The display stack 334 may be attached to the transparent cover 332, or below the transparent cover 332 without interstitial layers. The display stack 334 is similar to the display stack 314 in FIG. 3B, with the side surfaces of the display components defining a portion of the side surface of the enclosure of the device.

The device 330 also includes an intermediate layer 335, which may be below the display stack 334 and above the bottom portion 336, and which may define a peripheral wall that defines the outer boundaries of a cavity 338. More particularly, the bottom portion 336 and the intermediate layer 335 (which may have the appearance of a frame) cooperate to define at least part of the internal cavity 338. The internal cavity 338 is otherwise similar to the cavity 304 in FIG. 3A, and components of the device 330 may be positioned in the cavity 338. Such components may include, for example, a battery, processor, circuit board, memory, hard drive, antennas, cameras (which may be aligned with openings in the device 330), environmental sensors (e.g., accelerometers, barometric sensors), biometric sensors (e.g., heart rate sensors), and the like.

Figure 3E:
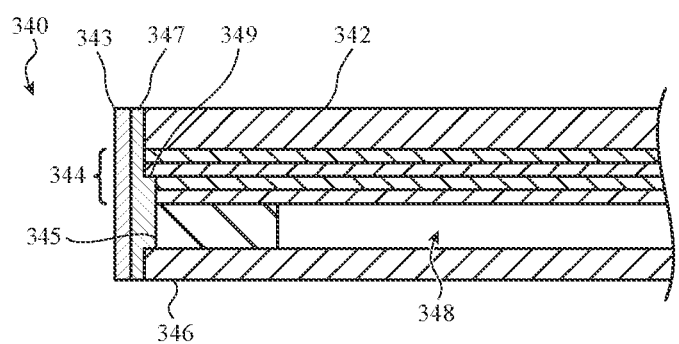

FIG. 3E shows a partial cross sectional view of another example device 340 (which may be an embodiment of the device 100). In this case, instead of the layered components of the device defining portions of the side surface of the device 340, the device 340 includes a side member 343 positioned along the side of the device 340, covering and protecting the end surfaces of the various layers. The device 340 may include a transparent cover 342 (e.g., a first layer) and a display stack 344 (e.g., a second or intermediate layer) below the transparent cover 342 and above a bottom portion 346 (e.g., a third layer). The display stack 344 may be attached to the transparent cover 342, or below the transparent cover 342 without interstitial layers. The display stack 344 is similar to the display stack 314 in FIG. 3B.

The device 340 also includes an intermediate layer 345, which may be below the display stack 344 and above the bottom portion 346, and which may define a peripheral wall that defines the outer boundaries of a cavity 348. More particularly, the bottom portion 346 and the intermediate layer 345 (which may have the appearance of a frame) cooperate to define at least part of the internal cavity 348. The internal cavity 348 is otherwise similar to the cavity 304 in FIG. 3A, and components of the device 340 may be positioned in the cavity 348. Such components may include, for example, a battery, processor, circuit board, memory, hard drive, antennas, cameras (which may be aligned with openings in the device 340), environmental sensors (e.g., accelerometers, barometric sensors), biometric sensors (e.g., heart rate sensors), and the like.

The side member 343 may extend around the entire periphery (or substantially the entire periphery) of the device, thus covering and optionally protecting the end surfaces of the various layers. The side member 343 may be attached to the device 340 using an adhesive 347 (which may be an epoxy or any other suitable bonding agent). The layers of the device 340 may also be shaped or otherwise configured to define a cavity 349 along the side of the device 340. The adhesive 347 may at least partially fill the cavity 349, thereby increasing the mechanical strength of the bond between the adhesive 347 and the layers, and thus increasing the mechanical strength of the coupling between the side member 343 and the layers of the device 340. The side member 343 may be any suitable material, such as stainless steel, aluminum, magnesium, titanium, a metal alloy, a polymer, a composite, carbon fiber, or the like.

The various layers of the devices 100, 310, 320, 330, and 340 may be attached to one another in any suitable way, such as those set forth above with respect to the notebook computer implementations. For example, they may be secured using adhesives, bolts, screws, threaded fasteners, rivets, stakes, latches, clips, or any other suitable techniques.

FIGS. 3B and 3D illustrate components of a display stack having exposed side surfaces in the context of a smartphone. However, any electronic device that includes a display may have a construction analogous to those shown in FIGS. 3B and 3D, with the side surfaces of one or more display components defining a portion of a side surface of an enclosure. For example, a clamshell phone (e.g., with a base portion having a keypad positioned therein and a display portion hinged to the base portion) or a notebook computer with a display (e.g., in a display portion) may have exposed display components around the peripheral side surface of the enclosure of the display portion.

FIGS. 1-3E show the concepts and construction principles in the context of one example electronic device. Similar concepts and principles may apply equally or by analogy to other devices or device configurations. For example, FIGS. 4-10D show how a layered enclosure may be implemented in an electronic device with two portions hinged or otherwise rotatably coupled to one another, such as a clamshell phone or "flip-phone." Of course, the concepts described with respect to these figures are applicable to other types of electronic devices as well, such as handheld electronic devices with articulable covers (e.g., tablet computers with folding covers), foldable electronic devices, notebook computers, wearable electronic devices, and the like.

Figure 4:
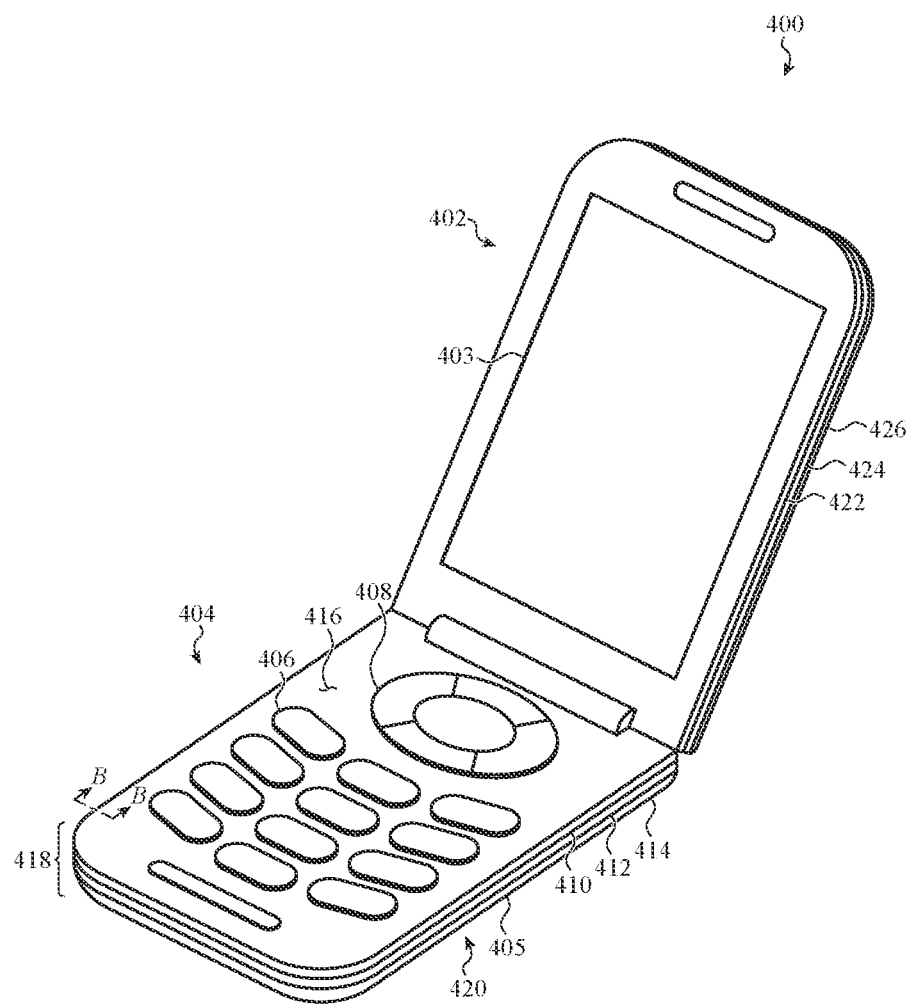
FIG. 4 depicts another example electronic device.

FIG. 4 depicts an electronic device 400 (or simply "device 400") that may include an enclosure formed of multiple layers of functional components, as described above. The device 400 resembles a clamshell-style phone that has a display portion 402 and a base portion 404 flexibly or rotatably coupled to the display portion 402. The display portion 402 includes a display 403 that provides a primary means of conveying visual information to the user, such as by displaying text, digits, images, graphical user interfaces, and the like.

The base portion 404 may include various types of input mechanisms, such as a keypad 406 (which may include a plurality of buttons, keys, touch-sensitive input devices, or other input devices) and a directional pad 408 (which may also include a plurality of buttons, keys, touch-sensitive input devices, or other input devices). In some cases, the keypad 406 and/or the directional pad 408 may be or may include a touch- and/or force-sensitive input device that is configured to receive various types of inputs, such as touch inputs (e.g., gestures, multi-touch inputs, swipes, taps, etc.), force inputs (e.g., presses or other inputs that satisfy a force or deflection threshold), touch inputs combined with force inputs, and the like.

The input mechanisms (as well as other components of the device 400) may be housed in or attached to (or otherwise integrated with) an enclosure 405. The enclosure 405 defines exterior surfaces, including a top surface 416, a bottom surface 420, and side surfaces 418. The side surfaces 418 may extend from the top surface 416 to the bottom surface 420, and may define the height of the base portion 404. As the top surface 416 may include input devices such as keypads, directional pads, touch sensors, keyboard, touch- and/or force-sensitive input devices, etc., the top surface 416 may also be referred to as an input surface.

The display portion 402 and the base portion 404 may be coupled to one another such that they can be positioned in an open position and a closed position. In the open position, a user may be able to provide inputs to the device 400 via the base portion 404 while simultaneously viewing information on the display portion 402. In the closed position, the display portion 402 and the base portion 404 are collapsed against one another. More particularly, the display portion 402 and the base portion 404 may be hinged together (e.g., via a pivot or hinge mechanism, or other suitable flexible coupling) to form a clamshell-style device that can be moved (e.g., rotated) between an open and a closed configuration.

As noted above, the base portion 404 may include multiple components, in a layered or laminated configuration, that together define the enclosure 405 of the base portion 404. For example, the base portion 404 may include a top case 410, an intermediate layer 412, and a bottom case 414. The top case 410, intermediate layer 412, and bottom case 414 (and any additional layers that may be included) may cooperate to define the exterior surfaces of the enclosure 405. For example, the top case 410 may define all or part of the exterior top surface 416 of the enclosure 405, as well as a portion of the side surface 418 of the enclosure 405. The bottom case 414 may define all or part of the exterior bottom surface 420 of the enclosure 405, as well as another portion of the side surface 418 of the enclosure 405. The intermediate layer 412 (as well as any additional intermediate layers between the top and bottom cases) may define yet another portion of the side surface 418 of the enclosure. The side surfaces of each layer may be exposed around substantially the entire side surface of the base portion 404, producing a layered or laminated appearance around the entire periphery of the base portion 404. Moreover, the interfaces between adjacent layers may be substantially planar or otherwise configured to producing substantially straight, unbroken seams between the layers around the periphery of the device.

In addition to defining a portion of the side surface 418 of the enclosure 405, the intermediate layer 412 may provide electrical or other computing functionality to the device 400. For example, the intermediate layer 412 may be an electrically operative component, such as a circuit board (e.g., a printed circuit board) on which electrical components of the device 400 are physically and/or electrically coupled. In such cases, the circuit board (or other electrically operative component) may include conductive traces that are integrated with a substrate material, and may include electrical components coupled thereto, including but not limited to processors, memory, batteries, dome switches (e.g., for keypad buttons or keys), antennas, light sources, display components, haptic actuators, and the like. In other cases, the intermediate layer 412 may be a component other than a circuit board. For example, it may be a reinforcing structure (e.g., a carbon fiber or metal structure that reinforces the top case 410 and/or the bottom case 414), a keypad substrate, a light guide layer (e.g., for distributing light to buttons of a keypad), or any other suitable component. While FIG. 4 shows one intermediate layer 412, this is merely exemplary, and the device 400 may include multiple intermediate layers. In such cases, the enclosure 405 may include more than the three layers that form (and are visible on) the side surfaces 418 of the enclosure 405.

In addition to providing different functions, the top layer (e.g., the top case 410), the intermediate layer 412, and the bottom layer (e.g., the bottom case 414) may be formed of different materials. For example, the top case 410 and the bottom case 414 may be formed of metal (e.g., aluminum, stainless steel, zinc, titanium, etc.), and the intermediate layer 412 may be formed of a different material such as fiberglass, carbon fiber, plastic, polycarbonate, glass, a different kind of metal, or the like. The particular materials selected for each layer may be selected based on various considerations and may be selected to provide various different functions and/or benefits. Example materials for the top and bottom cases 410, 414 as well as the intermediate layer 412 include metal, plastic, fiberglass, carbon fiber, glass, reinforced plastics, and so on. Such materials may be used in any suitable combination and/or order to form the enclosure 405.

Further, the top case 410, the intermediate layer 412, and the bottom case 414 may have any suitable thicknesses, and in some cases may have different thicknesses (at least at their peripheral sides, which define their respective portions of the side surface 418 of the enclosure 405). In some cases, the top case 410 is the thinnest of the layers and the bottom case 414 is the thickest of the layers, though other configurations are also contemplated.

In some cases, the display portion 402 may be constructed in a similar manner to the base portion 404, with multiple layers forming an enclosure portion of the display portion 402. Also like the base portion 404, the layers that form the enclosure (e.g., the exterior surfaces of the display portion 402) may be more than just enclosure components, and they may provide display-related functions as well as forming the exterior surface of the enclosure. For example, as described herein, the exterior surfaces of the display portion 402 may be defined by a transparent cover 422, such as a glass or plastic sheet that covers and protects the display 403, an intermediate layer 424, and a back layer 426. The back layer 426 may define a back surface of the display portion 402, as well as a portion of a side surface of the display portion 402. The transparent cover 422 may define a front surface of the display portion 402, and may also define a portion of the side surface of the display portion 402. The intermediate layer 424, which may be a display layer (e.g., a polarizer, light guide panel, light diffuser, or the like, or multiple of such layers), may also define a portion of the side surface of the display portion 402. Like the layers that define the exterior side surfaces of the base portion 404, the layers that define the exterior side surfaces of the display portion 402 may be different thicknesses, different combinations of materials, and may provide various computing or display functions in addition to defining exterior surfaces of the display portion 402. Further, while the display portion 402 in FIG. 4 is shown as having three distinct layers defining its side surfaces, this is merely exemplary, and the display portion 402 may have more or fewer layers that what is shown.

Figure 5:
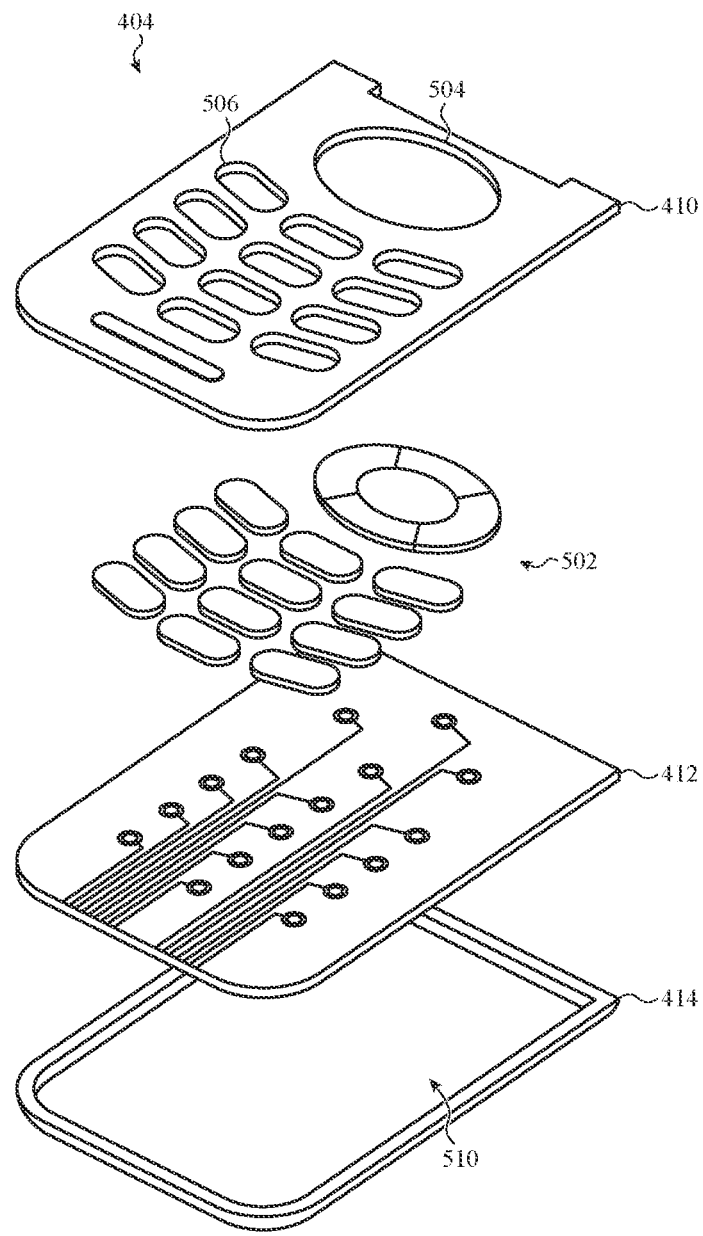
FIG. 5 depicts a simplified exploded view of a base portion of the electronic device of FIG. 4.

FIG. 5 is a partial exploded view of the base portion 404 of the device 400. As described above, the device 400 includes a top case 410, an intermediate layer 412, and a bottom case 414. The top case 410 may be a first or top layer of the base portion 404, and may define a top or user input surface of the base portion 404. The top case may optionally define openings, such as a directional pad opening 504 and a keypad opening 506. The keypad opening 506 may be a single opening, or it may include a web with multiple segmented openings for individual buttons or keys. The directional pad opening 504 may be configured to receive a directional pad (e.g., a glass or plastic cover that is configured to accept inputs at multiple different locations to perform multiple different actions based on the location of the received input). In some cases, the top case 410 may include different openings or no openings in the top surface.

As described above, the top case 410 defines both a top surface of the base portion 404 as well as a portion of the side surface of the base portion 404. That is, the side surfaces of the top case 410, which extend around the perimeter of the top case 410, are exposed and define a top portion of the side surface 418 (FIG. 4) of the base portion.

Below the top case 410 is the intermediate layer 412 (e.g., a second layer). As shown in FIG. 5, the intermediate layer 412 is a keypad substrate, though this merely one example of the type of component that may provide computing or electrical functions to the device 400 and also define a portion of the side surface of the enclosure. The intermediate layer 412 may be an electrically operative component, such as a circuit board that includes conductive traces, dome switches (e.g., for the keypad and directional pad), solder pads, vias, and the like. The intermediate layer 412 may also include conductive traces or connectors for electrically connecting components attached to the intermediate layer 412 to processors or other computing components.

The intermediate layer 412 may include dome switches coupled thereto, which may be collapsed or otherwise contacted by buttons 502 disposed above the dome switches. The buttons 502 may be mechanically attached to the intermediate layer 412, or they may be mechanically attached to a separate component (e.g., a button or key support plate that is positioned between the top case 410 and the intermediate layer 412). Where a support plate is included, it may form an additional intermediate layer that defines yet another portion of the side surface of the enclosure. In such cases, the side surface of the base portion 404 may have four distinct layers or portions.

The base portion 404 may also include a bottom case 414, which similarly defines a portion of the side surface of the base portion 404. As shown, the bottom case 414 may include a peripheral wall that defines a cavity 510. In other cases, the bottom case 414 may not define a cavity. For example, it may be a substantially planar sheet. In some cases, as described herein, a base portion 404 may include a substantially planar bottom case and a separate wall component that, when coupled to form the enclosure of the base portion 404, produces a shape or configuration similar to the bottom case 414 shown in FIG. 5, which includes an integrated wall structure.

The top case 410, intermediate layer 412, and bottom case 414 may be coupled together to form a substantially rigid base portion 404 in any suitable way. For example, the components may be coupled using adhesives, bolts, screws, threaded fasteners, rivets, stakes, latches, clips, or any other suitable technique. In some cases, interstitial layers (e.g., the intermediate layer 412) may be held captive between two opposing layers (e.g., the top case 410 and the bottom case 414) that are mechanically coupled with fasteners, adhesives, or the like.

The layers that define the side surface of the base portion 404 and the display portion 402 may be substantially planar or flat along their peripheral regions. This configuration may result in substantially straight or linear seams between the layers along the side surfaces. In such cases, the seams may appear as unbroken lines or seams around the entire periphery (or substantially the entire periphery) of the enclosure that is defined by the layers.

As noted above, FIG. 5 illustrates one example configuration of a base portion 404 with external surfaces defined by multiple layers of components. While FIG. 5 shows only three layers, it will be understood that other configurations with more or different layers or components between the top case 410 and the bottom case 414 are also contemplated, where the additional layers or components also define portions of the side surface of the base portion 404. Examples of additional layers include, without limitation, additional printed circuit boards, flexible circuit substrates, display components, light guide layers, metal sheets, shielding layers, reinforcement layers, electrode layers (e.g., for a touch- and/or force-sensing systems), antennas, magnets, spacers, and the like. Where magnets are incorporated in a layer, they may be positioned in openings in a peripheral portion of the layer. For example, a layer may define one or more openings along a peripheral portion of the layer, and individual magnets may be positioned in the one or more openings. The magnets may be configured to be substantially the same size and shape as the openings (e.g., producing a tolerance fit), such that the magnets and the peripheral portion of the layer have a substantially uniform thickness. The magnets may therefore be integrated into the structure of the layered enclosure. Incorporating magnets into a peripheral portion of a layer may cause the side of the enclosure proximate the magnets to magnetically attract other components or objects.

Figure 6:
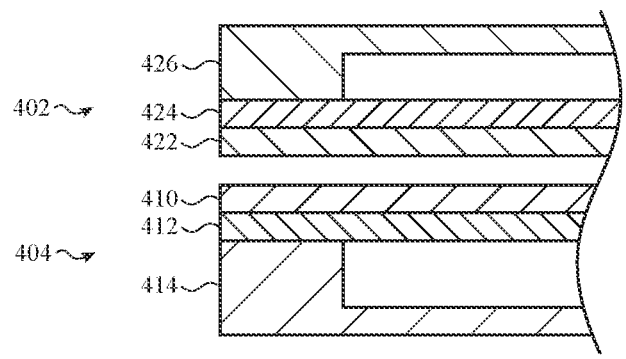
FIG. 6 depicts a partial cross-sectional view of the electronic device of FIG. 4.

FIG. 6 is a partial cross-sectional view of the device 400 of FIG. 4, viewed along line B-B in FIG. 4. FIG. 6 shows the device 400 in a closed configuration, such as where the display portion 402 is rotated about a hinge or other flexible coupling mechanism such that the front surface of the display is facing (e.g., substantially parallel to) the top or user input surface defined by the top case of the base portion. FIG. 6 illustrates how components of the display and base portions extend to and define the side surfaces of the display and base portions. The resulting side surfaces have a layered appearance, with each layer (e.g., each component) defining a visually and structurally distinct layer. Moreover, the layered structure of both the display portion 402 and the base portion 404 provides a consistent construction and appearance across both portions of the device.

Figure 7:
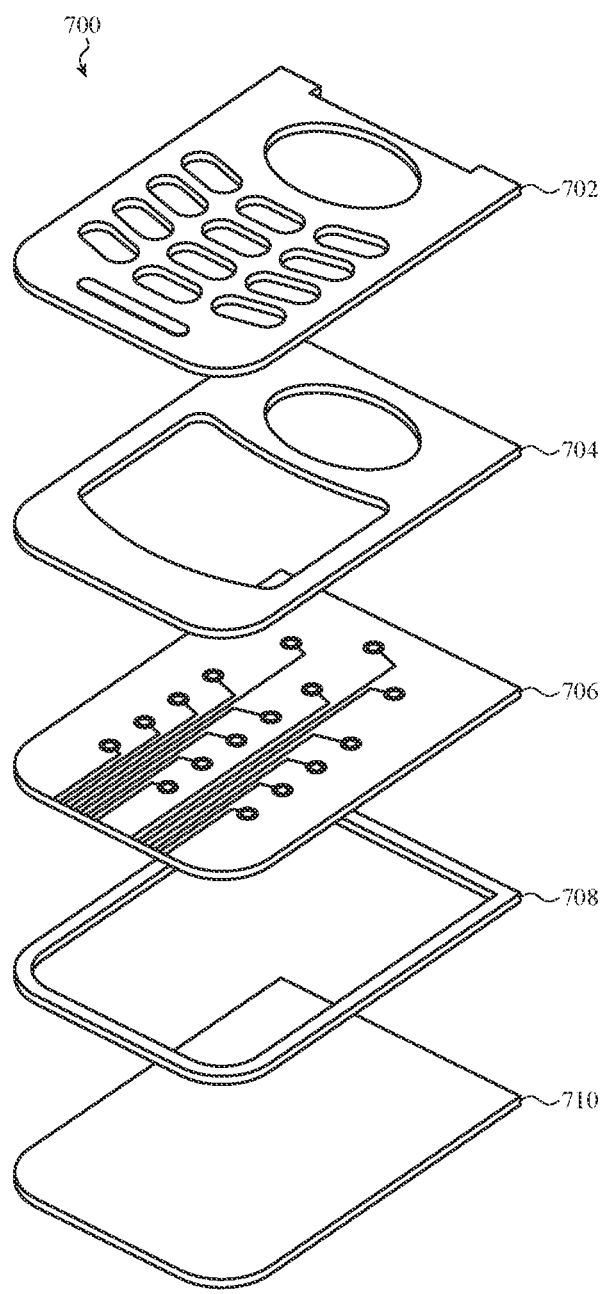
FIG. 7 depicts a simplified exploded view of a base portion of another example electronic device.

FIG. 7 is an exploded view of part of another example base portion 700 that uses a layered construction as described herein. The base portion 700 differs from the base portion 404 in that the base portion 700 includes more layered components that define the side surface of the base portion 700 while also providing computing and electrical functionality to the electronic device.

The base portion 700 may include a first layer 702, which may correspond to a top case of a clamshell-style phone (as shown), or it may be any other layer or component that defines a top surface of the enclosure of the base portion 700, regardless of the particular type of electronic device with which it is incorporated. The first layer 702 may be similar in construction, function, material, etc., to the top case 410 of FIGS. 4-5. For example, the first layer 702 may define a keypad opening, a web, a directional pad opening, or the like. The first layer 702 may be formed from any suitable material, such as metal, plastic, carbon fiber, fiberglass, glass, sapphire, ceramic, or the like. In some cases, the first layer 702 may have one or more pigment layers, applied to a bottom and/or a top surface of the first layer 702. Such pigment layers, which may include inks, pigments, dyes, colored films, etc., may extend to the edges of the first layer 702 and thus may also be visible on (and may define a portion of) the side surfaces of the base portion 700.

The base portion 700 may also include a second layer 704. The second layer 704 may be a structural reinforcement or brace for the first layer 702 (or an underlying layer). In some cases, the second layer 704 may be sheet with openings that correspond to the openings in the first layer 702 (in cases where the first layer 702 has openings). In some cases, the second layer 704 comprises a series of ribs, lattices, beams, or other structural shapes and/or feature that increase the stiffness, strength, toughness, rigidity, or other physical property of the first layer 702 or the base portion 700 as a whole. The second layer may be formed of any suitable material, such as metal (e.g., aluminum, steel, magnesium, titanium), plastic, fiberglass, carbon fiber, or the like. The second layer 704 may be bonded, adhered, or otherwise attached to the first layer 702 (or any other adjacent layer) in any suitable way, as described above (e.g., including adhesives, fasteners, mechanical interlocks, etc.).

The base portion 700 may also include a third layer 706. The third layer 706 is shown as a circuit board, similar to the example of the intermediate layer 412 shown and described with respect to FIG. 5. The third layer 706 may have the same or similar features and functions as the intermediate layer 412. For example, the third layer 706 may be a printed circuit board substrate having vias, conductive traces, solder pads, dome switches, interconnects, or other electrically functional components incorporated therewith. The third layer 706 may also be a substrate or base structure for the buttons or keys of a keypad, and may thus include electrical and/or mechanical features that enable the button mechanisms (or other suitable input devices) to operate and accept inputs from a user.

The base portion 700 may also include a fourth layer 708. The fourth layer 708 is shown as a spacer layer configured as a rim or frame that defines an internal cavity in which components may be housed. The spacer layer may be used to define an internal cavity of the base portion 700, in which other components may be positioned. For example, the internal cavity defined by the spacer layer (as well as layers above and below the spacer layer) may house a battery, processor, circuit board, memory, a hard drive, or any other suitable component(s).

The base portion 700 may also include a fifth layer 710, which may correspond to a bottom case of an electronic device. Accordingly, the fifth layer 710 may be similar in construction, function, material, etc., to the bottom case 414 of FIGS. 4-5. For example, the fifth layer 710 may define a bottom surface of the base portion 700, as well as a portion of the side surface, and may be formed from metal, plastic, carbon fiber, fiberglass, glass, or any other suitable material. The fifth layer 710 may be a substantially continuous sheet. The fifth layer 710 may be substantially flat or planar, or it may have a contoured shape. For example, a peripheral region of the fifth layer 710 (e.g., the outer periphery of the fifth layer 710) may be curved upwards to produce a shape with a concave interior-facing surface and convex exterior-facing surface. The fifth layer 710 may have a substantially continuous thickness, or the thickness may be different in different regions of the fifth layer 710. For example, the fifth layer 710, or bottom case, may include a thicker region or frame around a thinner central portion, thus defining a recess in which components may be housed (e.g., similar to the configuration of the bottom case 414 shown in FIG. 5).

The multiple layered components shown in FIG. 7 may have substantially flat or planar interfacing regions along their outer periphery. When assembled, the flat or planar interfacing regions form seams between adjacent layers, with the seams extending around substantially the entire side surface of the resulting base portion 700. The seams may be substantially flat or linear, as a result of the substantially planar configuration of the interfacing regions of the individual layers. In cases where the peripheral regions of the layers are not substantially flat or planar, the seams may not appear linear. For example, if the peripheral regions of two adjacent layers have wavy or crenate configurations (which may interlock or otherwise align with one another), those seams may have a wavy or crenate path around the periphery of the base portion 700.

FIGS. 8A-8D are partial cross-sectional views of example base portions, viewed along line A-A in FIG. 4, showing various configurations of layers and side shapes of a base portion (or other enclosure or electronic device using the construction technique described herein). While the partial cross-sections shown in these figures are viewed at one particular location on a base portion (or other enclosure), these cross-sections may be representative of substantially an entire peripheral region of the base portion. For example, because the components forming the side surface of the base portion are layers that may extend to the perimeter of the base portion (e.g., they extend edge-to-edge of the device), the same or substantially the same cross-section may exist at all (or most) locations around the periphery of the base portion. In some cases, the side surface may have openings formed therein, such as for buttons, charging ports, electrical/communication connectors (e.g., universal serial bus (USB) ports, display ports), or other components. In such cases, the cross-sections in those areas may differ from those shown herein, and the seams between layers may be broken or discontinuous at the openings. Apart from these discontinuities, the layered appearance and construction may extend around substantially the entire periphery of the base portion. In some cases, the seams and/or sides of the layers extend around more than 80%, more than 90%, or more than 95% of the periphery of the base portion.

In some cases, layers may have discontinuities or gaps along the periphery of the layers, and the discontinuities or gaps may be filled with other components, which themselves define or form part of the side surface of the enclosure. For example, a metal layer may have a gap, along its periphery, that is configured to be aligned with an antenna that is positioned within the enclosure. Instead of the gap defining an opening in the side surface of the housing, a dielectric (or other suitably RF transparent) material may be positioned in the gap, thereby forming a continuous and solid side surface while also allowing the antenna to transmit and/or receive signals through the dielectric material. Other types of components may be positioned in gaps or discontinuities of layers, such as antennas, transparent windows (e.g., clear glass or plastic), light sources, light guides, connectors, magnets, or the like. In such cases, those components may define part of the side surface of the enclosure along with any other layers of the enclosure.

Figure 8A:
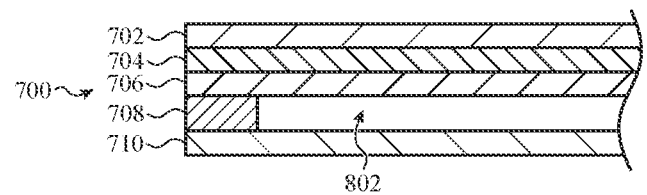
FIGS. 8A-8E depict partial cross-sectional views of base portions of various example electronic devices.

FIG. 8A shows a partial cross-section of the base portion 700 shown in FIG. 7. In particular, FIG. 8A shows the first layer 702 (e.g., a top case), the second layer 704 (e.g., a reinforcing layer), the third layer 706 (e.g., a printed circuit board), the fourth layer 708 (e.g., a spacer), and the fifth layer 710 (e.g., a bottom case), all having exposed side surfaces that form part of the side surface of the base portion. FIG. 8A also shows how the fourth layer 708 acts as a spacer to define an internal cavity 802 in which device components (e.g., processors, memory, storage media, circuit boards, etc.) may be positioned.

Figure 8B:
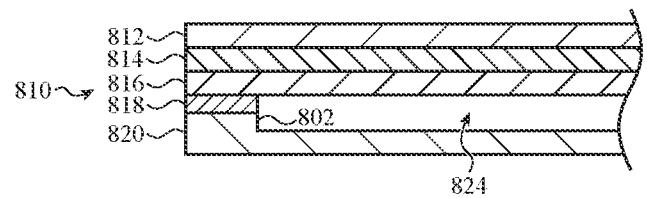

FIG. 8B shows a partial cross-section of a base portion 810. Similar to the base portion 700, the base portion 810 includes a first layer 812 (e.g., a top case), a second layer 814 (e.g., a reinforcing layer), a third layer 816 (e.g., a printed circuit board), a fourth layer 818 (e.g., a spacer), and a fifth layer 820 (e.g., a bottom case). Whereas the fifth layer 710 in FIGS. 7 and 8A may be substantially flat (at least at the peripheral region), the fifth layer 820 in FIG. 8B may have a peripheral wall 822 (which may be similar to the peripheral wall defining the cavity 510, as shown in FIG. 5). The peripheral wall 822 may cooperate with the fourth layer 818 (e.g., a spacer layer) to define an internal cavity 824 in which device components may be positioned. The combination of the peripheral wall 822 and the fourth layer 818 may produce a larger internal cavity than that shown in FIG. 8A, and illustrates how different configurations of the individual layers may be used to produce different form factors and different sized or shaped interior cavities (as well as different outside dimensions) of the enclosure.

Figure 8C:
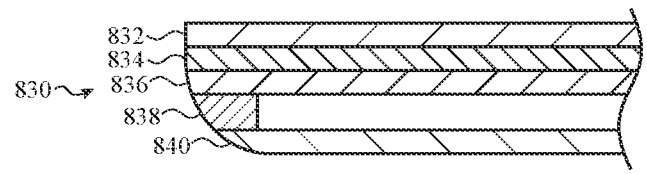
Figure 8D:
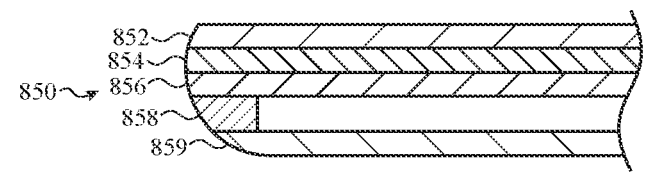

FIGS. 8C and 8D illustrate example cross-sections of a layered base portion (similar to the base portion 700), in which the side surfaces of the base portion are curved or contoured, rather than being substantially flat or planar (as shown in FIGS. 8A-8B, for example). In particular, a base portion 830 in FIG. 8C includes a first layer 832 (e.g., a top case), a second layer 834 (e.g., a reinforcing layer), a third layer 836 (e.g., a printed circuit board), a fourth layer 838 (e.g., a spacer), and a fifth layer 840 (e.g., a bottom case). The side surface of the base portion 830 defines a curved surface. The curved surface extends along the side surface of the base portion 830 such that at least two of the side surfaces of the layers are curved to define the overall curve of the base portion 830. For example, as shown in FIG. 8C, the side surfaces of the third layer 836, fourth layer 838, and fifth layer 840 may all define portions of the overall curve of the base portion 830. The curve shown in FIG. 8C is merely one example curve, and other curved shapes may also be formed. For example, a base portion may be constructed to have smaller or larger radii, and/or incorporating or spanning more or fewer layers that what is shown in FIG. 8C. In some cases, the curved shape of the side of a base portion is consistent around substantially the entire periphery of the base portion. In other cases, different portions of the side surface of a base portion may have a different shape. For example, a side surface along a back portion of the base portion (e.g., where a display portion may be coupled, via a hinge, to the base portion) may be flat, or may have cutouts, recesses, or other features to facilitate the coupling to the display portion, side surfaces along the lateral and front portions of the base portion may have a curved shape or profile.

FIG. 8D shows a base portion 850 with a side surface having a different curved profile than that shown in FIG. 8C. In particular, the base portion 850 in FIG. 8D includes a first layer 852 (e.g., a top case), a second layer 854 (e.g., a reinforcing layer), a third layer 856 (e.g., a printed circuit board), a fourth layer 858 (e.g., a spacer), and a fifth layer 859 (e.g., a bottom case). The side surface of the base portion 850 defines a curved surface having two curved regions. For example, the first and second layers 852, 854 are curved or angled towards the top surface of the base portion 850, while the third, fourth, and fifth layers 856, 858, and 859 are curved or angled towards the bottom surface of the base portion 850. As noted above, the curved shape of the side of the base portion 850 may be consistent around substantially the entire periphery of the base portion, or different portions of the side surface may have different curvatures (or no curvature).

The curved or contoured side surfaces of the base portions 830, 850 in FIGS. 8C-8D may be formed in various ways. In some cases, the base portions 830, 850 may be assembled by securing some or all of the multiple layers together, and then subjecting the assembled layers to a forming process, such as machining, grinding, cutting, polishing, or any other suitable technique to remove material from multiple layers and define the desired shape of the side surface. In other cases, the side surfaces of each individual layer may be shaped prior to being assembled into the base portion, and once assembled, the shapes of the side surfaces of each individual layer may together form a continuous, curved side surface of the base portion. In some cases, even where the side surfaces of individual layers are shaped prior to assembly, the base portion may be subjected to a material removal operation after assembly, such as a machining or polishing step, to remove any sharp edges or ridges due to misalignment of the layers. Machining, grinding, polishing, and/or other material removal operations may also be used for base portions with straight or flat side surfaces.

Figure 8E:
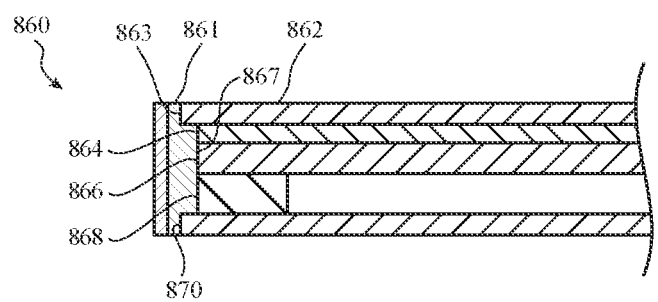

FIG. 8E shows a base portion 860 with a side surface defined by a side member 863. The side member 863, which may be similar to the side member 343 (FIG. 3E) and may extend around the entire periphery (or substantially the entire periphery) of the device, thus covering and optionally protecting the end surfaces of the various layers. The base portion 860 in FIG. 8E also includes a first layer 862 (e.g., a top case), a second layer 864 (e.g., a reinforcing layer), a third layer 866 (e.g., a printed circuit board), a fourth layer 868 (e.g., a spacer), and a fifth layer 870 (e.g., a bottom case).

The side member 863 may be attached to the base portion 860 using an adhesive 861 (which may be an epoxy or any other suitable bonding agent). The side member 863 may be any suitable material, such as stainless steel, aluminum, magnesium, titanium, a metal alloy, a polymer, a composite, carbon fiber, or the like. The layers of the base portion 860 may also be shaped or otherwise configured to define a cavity 867 along the side of the base portion 860. The adhesive 861 may at least partially fill the cavity 867, thereby increasing the mechanical strength of the bond between the adhesive 861 and the layers, and thus increasing the mechanical strength of the coupling between the side member 863 and the layers of the base portion 860.

Figure 9:
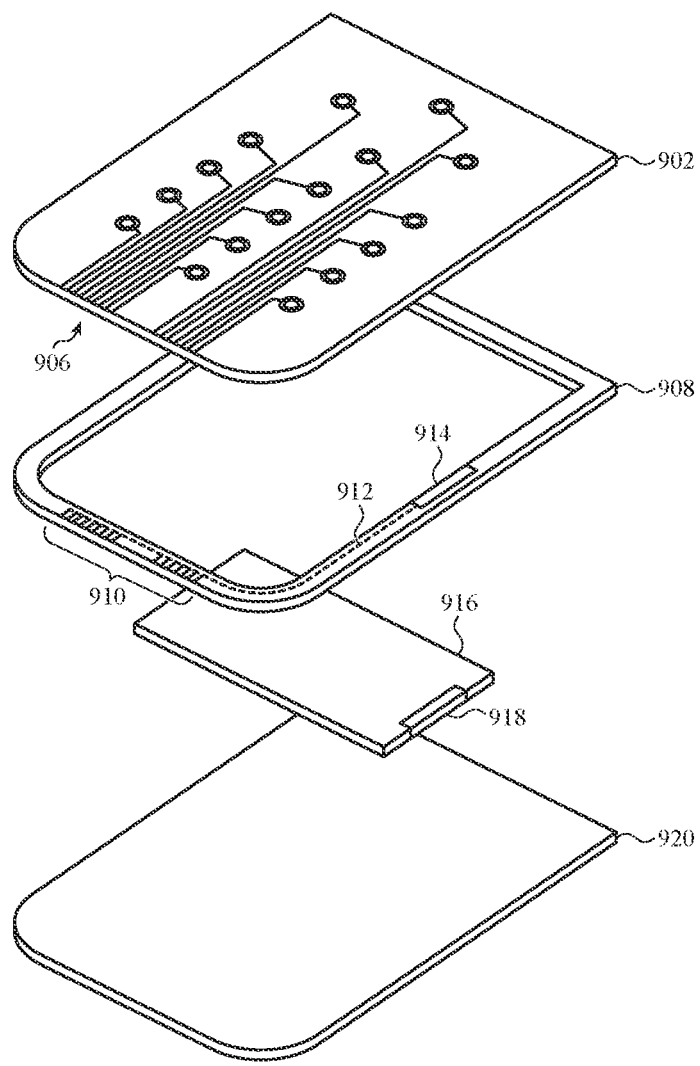
FIG. 9 depicts a simplified exploded view of a base portion of another example electronic device.

As noted above, the layers that form the enclosure of an electronic device (e.g., an enclosure of a base portion of a notebook computer) may provide electrical or computing functions in addition to defining the exterior side surfaces of the enclosure. For example, the printed circuit boards described with respect to FIGS. 5 and 7 may have various electrical components coupled thereto, such as a directional pad, electrical switching components for keypad buttons or keys, and the like. FIG. 9 shows another example of intermediate layers that define a portion of a side surface of an enclosure while also providing integral electrical functions of the device.

FIG. 9 shows an exploded view of several layers that may form part of a base portion of a clamshell-style phone (or any other suitable type of electronic device). In particular, FIG. 9 shows a first layer 902, which may be a printed circuit board on which electrical components are coupled. Similar to the printed circuit boards described above, where the first layer 902 is a printed circuit board, the circuit board substrate may define a portion of a side surface of the enclosure or device in which it is incorporated.

The first layer 902 may include conductive traces 906 on and/or in the material of the first layer 902. The conductive traces 906 may be configured to electrically couple to various electrical components on the first layer 902, such as dome switches (or other switches or touch- and/or force sensitive input devices or components), light sources, sensors, or the like. The conductive traces may carry electrical signals from these components to a processor or other computing component of a notebook computer.

The device shown in FIG. 9 may also include a second layer 908, which may be a spacer layer (as described above), and which may also define a portion of a side surface of the enclosure or device in which it is incorporated. The second layer 908 may be a circuit board, or any other suitable substrate or material.

In addition to helping to define the shape of the enclosure, the second layer 908 may include electrical conductors, traces, and connectors that carry signals from the first layer 902 to a processing component. For example, the second layer 908 may include electrical contacts 910 that that are configured to contact the conductive traces 906 of the first layer 902. The second layer 908 may also include conductive traces 912 (which may be on a surface of the second layer 908 or embedded within the second layer 908) that electrically couple the electrical contacts 910 to an electrical connector 914. The electrical connector 914 may be configured to couple to a processor module 916 via a complementary connector 918. By incorporating electrical contacts and traces into the second, spacer layer 908, valuable space on the first layer 902 may be available for other components, especially in cases where the first layer 902 includes numerous electrical components or electrical components that require numerous signal lines. Further, by incorporating conductive traces and connectors in multiple layers, and allowing those layers to electrically interconnect to one another, additional avenues for electrically connection components are provided. This may facilitate more efficient interconnection of electrical components, and/or may allow more options for the placement of interconnected electrical components.

The processor module 916 may include one or more processors and/or memory, or other circuit elements that provide computing functionality to a device. The processor module 916 may be positioned within an internal cavity defined at least in part by the second layer (e.g., spacer) 908 and a third layer 920 (which may be a bottom case, as described above).

While FIG. 9 shows a processor module 916 coupled to electrical traces on another circuit board via conductive traces (or other conductors) 912 in the second layer 908, this type of construction may be used to interconnect any suitable types of electrical components. For example, traces 912 in a layer may be used to provide power from a battery to any other electrical component(s) in a device. As another example, traces 912 in a layer may be used to electrically couple an antenna structure (e.g., a conductor that radiates and/or receives wireless signals) to antenna circuitry or other communications circuitry. In some cases, an antenna structure may take the form of a conductive material (e.g., a conductive trace, wire, metal strip, or other conductor) that is integrated with or coupled to a layer. For example, with reference to FIG. 9, a conductive trace that operates as an antenna structure may be positioned on or in the second layer 908, and may be electrically coupled to the processor module 916 via a conductive trace similar to the trace 912. Other components may also or instead by interconnected by conductive traces (or other conductors) that are integrated with layers of the device. In some cases, optical channels (e.g., fiber optics) may be used instead of or in addition to conductive paths. Optical channels may be implemented in the same or similar manner as the electrical connections described above.

Moreover, any electrical interconnection using conductors integrated with a layer, as shown in FIG. 9, may be configured to send and/or receive any suitable type of signal or power. For example, communications signals (e.g., analog or digital signals) may be carried, as well as direct current and/or alternating current power (e.g., from a battery, invertor, or other power source).

While FIG. 9 shows three layers of a device, these are merely portions of the device, and more layers may be included, with each additional layer (or a subset of the additional layers) also defining part of the side surface of the device. Additional layers may include a top case above the first layer 902, a reinforcing layer below the top case and above the first layer 902, and the like.

By building enclosures of electronic devices using multiple discrete layers, complex internal geometries can also be produced without material removal operations (or with less material removal operations than would otherwise be necessary to form such geometries). The complex internal geometries may be configured to conform to the shapes of internal components of the device, thereby maximizing the amount of material devoted to forming the enclosure and eliminating empty space, which may otherwise be wasted.

Figure 10A:
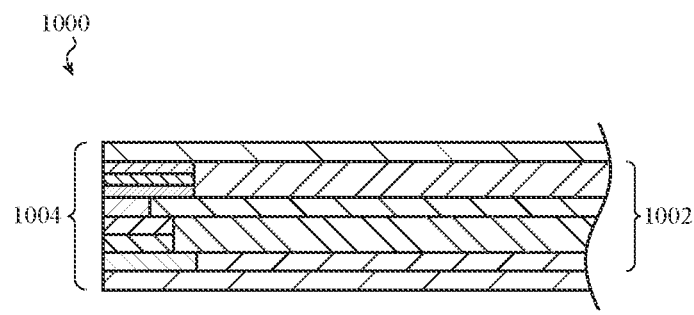
FIG. 10A depicts a partial cross-sectional view of an example electronic device with multiple layers conforming to an internal component of the electronic device.

FIG. 10A shows a partial cross-sectional view of an electronic device 1000 in which multiple layers of the device cooperate to define a non-planar interior wall of the interior volume of a device, where the interior wall conforms to a non-planar side profile of an electronic device assembly. The electronic device 1000 may be any suitable electronic device, such as a smartphone, clamshell-style phone, wearable electronic device, notebook computer, desktop computer, or the like.

The electronic device 1000 includes an electronic assembly 1002, which may include any suitable electronic device components, such as a circuit board, display assembly, battery, processor, haptic actuator, speaker, microphone, light source, or the like. (While the electronic assembly 1002 is shown as a component having four discrete, substantially planar layers, this is merely an example configuration showing an irregular, non-planar side profile. Other example electronic assemblies may include different components having different shapes and/or configurations.)

The electronic device 1000 may include multiple layers 1004 that together define an irregular, non-planar interior wall that conforms to the side profile of the electronic assembly 1002. Notably, because the non-planar interior wall conforms to the side profile of the electronic assembly 1002 (e.g., is in intimate contact with the electronic assembly 1002, at least along part of the side profile of the assembly 1002), empty space between the interior wall of the interior volume may be reduced or eliminated, thus maximizing the thickness of the enclosure while still accommodating the internal components.

The multiple layers 1004 that define the interior wall and the exterior side surface of the device 1000 may be any suitable components or layers, including circuit boards, reinforcing layers, spacers, light guide panels, and the like. Also, similar to the other layers described above, the multiple layers 1004 may be substantially continuous around the periphery of the device 1000, thus defining a continuous, laminated appearance around the side of the device. Furthermore, while the interior wall is shown in FIG. 10A as having one particular shape, the multiple layers 1004 may define differently shaped walls at other regions of the device 1000. For example, the cross-section shown in FIG. 10A may correspond to a location of the line B-B in FIG. 4 (e.g., a lateral side of a device). A cross-section along a bottom side of the same device, however, may define a different interior wall shape, such as a substantially planar surface, or a curved surface, or any other non-planar profile that is different from that shown in FIG. 10A. Also, the layers shown in FIG. 10A need not be only a frame or gasket-shaped component having material only along a periphery of the device, but may have regions that extend across the internal cavity, forming a substrate or other substantially planar region to which components may be attached.

Figure 10B:
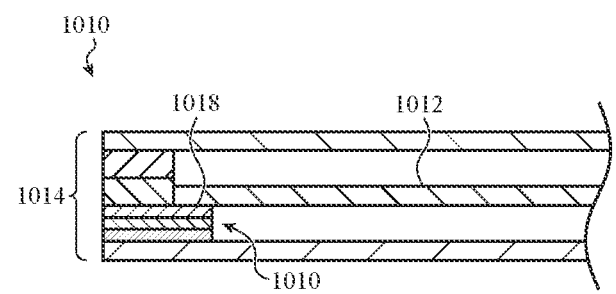
FIG. 10B depicts a partial cross-sectional view of an example electronic device with multiple layers cooperating to define a support for an internal component of the electronic device.

In yet other configurations, different layers of an enclosure may cooperate to define other complex geometries within an internal cavity of a device. FIG. 10B, for example, shows a partial cross-sectional view of an electronic device 1010 that includes multiple layers 1014 defining a continuous side surface of the electronic device 1010, as described above. A subset 1016 of the layers may form a ledge 1018 that supports a component 1012 of the device 1010. The component 1012 may be any component, such as a circuit board, stiffener, battery, haptic actuator, or the like. The ledge 1018 may also include a mechanical feature to facilitate attachment of the component 1012 to the ledge. For example, the ledge may define an opening (e.g., a smooth hole, a threaded hole, a splined hole, etc.), a protrusion (e.g., a pin or rod), a clip, an undercut, or any other suitable feature. Like the layers 1004 in FIG. 10A, and as described throughout this application, the multiple layers 1014 may have functions beyond merely forming the enclosure. For example, they may be circuit boards, display components, stiffeners, reinforcing members, light guides, electrode sheets (e.g., for touch- and/or force-sensing components), and the like.

In FIGS. 10A-10B, the enclosures may be formed by applying multiple layers each defining a portion of the interior geometry. In this manner, irregular, non-planar interior geometries may be formed without (or with less) machining or other material removal operations. This technique may have numerous advantages over material removal operations. For example, it may reduce manufacturing time, reduce wasted material, improve the fitment between the enclosure and internal components (e.g., reducing or eliminating space between the enclosure and internal components), use more efficient manufacturing techniques, and so on. As one particular example, instead of machining a complex, irregular internal geometry from a housing component, a stack of layers (which may be formed quickly from relatively simple forming processes such as stamping) may be laminated to produce the desired geometry. While further machining operations may be performed to finalize the internal geometry (e.g., polishing, threading, finishing, etc.), the amount of machining and post-processing may be substantially less than forming the same geometry without a laminated enclosure.

In some cases, an enclosure formed using multiple layers may define internal holes, cavities, or other spaces. In such cases, these spaces may be filled with a filler material. The filler material may increase the strength, stiffness, or other physical property of the enclosure. In some cases, the filler material may also increase thermal conductivity between layers, which may help draw heat away from heat producing components such as batteries, processors, and the like. The spaces and filler material may be specifically configured and positioned to provide thermally conductive paths that draw heat in advantageous directions, such as away from a battery and towards a portion of the device that will radiate the heat without negatively impacting usability of the device (e.g., towards a side of the device, which may cause less discomfort to a user than if it were directed towards a bottom or top of the device).

Figure 10C:
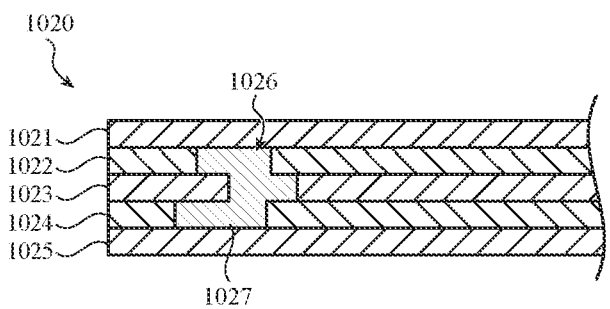
FIG. 10C depicts a partial cross-sectional view of an example electronic device with multiple layers cooperating to define an opening.
Figure 10D:
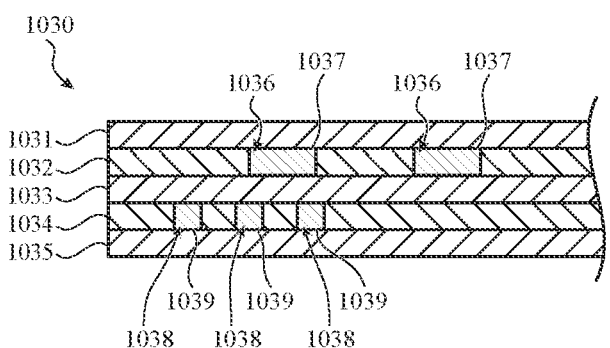
FIG. 10D depicts a partial cross-sectional view of an example electronic device with multiple layers with individual layers having openings.

FIGS. 10C and 10D show partial cross-sectional views of electronic devices in which internal spaces are filled with a filler material. FIG. 10C, for example, shows a partial cross-sectional view of a device 1020, which may be or may correspond to any suitable electronic device, such as a smartphone, clamshell-style phone, wearable electronic device, notebook computer, desktop computer, or the like.

The device 1020 includes a first layer 1021 (which may correspond to a top case of a clamshell-style phone or notebook computer), a second layer 1022, a third layer 1023, a fourth layer 1024, and a fifth layer 1025 (which may correspond to a bottom case of a clamshell-style phone or a notebook computer). The second, third, and fourth layers 1022-1024, which may be circuit boards, intermediate layers, stiffeners, or any other suitable layer or component as described herein, may each define an opening, and the openings may be aligned with one another or otherwise communicate to form an opening 1026. The opening 1026 may be filled with a filler material 1027. The filler material 1027 may be any suitable material, such as an adhesive, epoxy, thermoplastic or thermoset polymer, foam (which may be expanded or otherwise formed into a foam after a material is positioned in the opening 1026), metal, or the like. In cases where the filler material 1027 is an adhesive or other bonding agent, the filler material may retain the layers together (alone or in conjunction with other adhesives, fasteners, or the like).

As shown, the openings in the layers in the device 1020 are offset from one another, thus defining an irregular shape with undercuts. This shape may help improve the device's resistance to delamination and/or otherwise more generally increase the strength, stiffness, and/or toughness of the device.

FIG. 10D shows a partial cross-sectional view of a device 1030, which may be or may correspond to any suitable electronic device, such as a smartphone, clamshell-style phone, wearable electronic device, notebook computer, desktop computer, or the like. The device 1030 includes a first layer 1031 (which may correspond to a top case of a clamshell-style phone or notebook computer), a second layer 1032, a third layer 1033, a fourth layer 1034, and a fifth layer 1035 (which may correspond to a bottom case of a clamshell-style phone or a notebook computer). The second, third, and fourth layers 1032-1034, which may be circuit boards, intermediate layers, stiffeners, or any other suitable layer or component as described herein, may each define one or more openings. For example, the second layer 1032 may include openings 1036, and the fourth layer 1034 may include openings 1038. Unlike the openings in FIG. 10C, the openings 1036 and 1038 do not connect to one another.

Filler material 1037, 1039 may occupy the openings 1036, 1038, respectively. The filler materials 1037, 1039 may be any suitable material, such as an adhesive, epoxy, thermoplastic or thermoset polymer, foam, metal, or the like. In cases where the filler materials 1037, 1039 are an adhesive or other bonding agent, the filler materials 1037, 1039 may retain the layers together (alone or in conjunction with other adhesives, fasteners, or the like). The openings 1036, 1038 and filler materials 1037, 1039 may serve the same or similar functions as the opening 1026 and filler material 1027 described with respect to FIG. 10C.

As noted above, the components that define the exterior surfaces of an enclosure may be formed from metal. For example, referring to FIG. 4, the top case 410, which may define an exterior top surface 416 of the base portion 404 of the enclosure 405, may be formed of a metal material. Similarly, the bottom case 414, which may define an exterior bottom surface 420 of the enclosure 405, may also be formed of a metal material. The back layer 426 of the display portion 402 may also be formed of a metal material. Any suitable metal material may be used, such as aluminum, stainless steel, magnesium, amorphous metals, alloys, and the like. In some cases, however, the components that define exterior surfaces, such as the top and bottom cases 410, 414 and the back layer 426, may be formed of a composite structure formed of multiple layers. The composite structures may provide several advantages over a single metal member. For example, a composite structure may have preferred thermal properties, which may help dissipate heat from internal components of a device (e.g., a battery, processor, etc.). As another example, a composite structure may have an increased stiffness relative to a metal layer. FIGS. 11-19B depict example configurations of composite structures that may be used in electronic device enclosures (such as any of the enclosures described herein), and may particularly be used as the layers or components that define the exterior surfaces of an enclosure.

Figure 11:
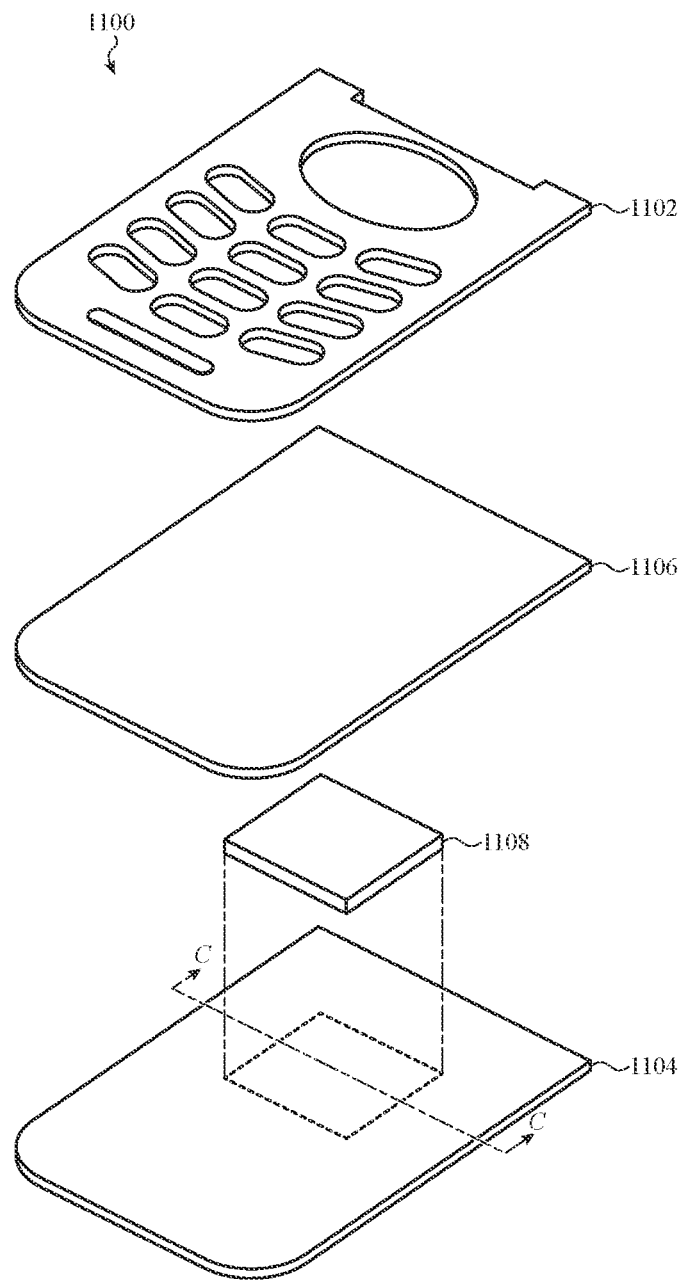
FIG. 11 depicts a partial exploded view of an example base portion for an electronic device.

FIG. 11 is a partial exploded view of a base portion 1100 of an electronic device. The base portion 1100 may be an embodiment of the base portion 404 in FIG. 4. Accordingly, aspects of the base portion 404 described above are equally applicable to the base portion 1100, and are not repeated here. As shown in FIG. 11, the base portion 1100 may include a top case 1102, a bottom case 1104, and an intermediate layer 1106. The top case 1102 may define an exterior top surface of the base portion 1100, and the bottom case 1104 may define an exterior bottom surface of the base portion 1100. The intermediate layer 1106 may define part of an exterior side surface of the base portion 1100, as described herein. In some cases, the intermediate layer 1106 may be a circuit board.

The base portion 1100 may also include a heat generating component, such as a processor 1108. The processor 1108 is one example of a heat generating component that may be positioned within the base portion 1100, and, as used herein, may represent other heat generating components as well, such as a battery, memory module, light source, power convertor, transistor, or the like. Where the intermediate layer 1106 is a circuit board, the processor 1108 may be operatively coupled to the intermediate layer 1106 (e.g., via solder or other suitable electrical connections). As described herein, the processor 1108 may also be thermally coupled to the bottom case 1104. For example, the processor 1108 may be in contact with an interior surface of the bottom case 1104, or it may be coupled to the bottom case 1104 via an adhesive, film, bonding pad, or other material. In some cases, the thermal coupling between the bottom case 1104 and the processor 1108 is configured to facilitate removal of heat from the processor 1108.

As noted above, composite structures may be used for components of an enclosure, such as the top case 1102 and/or the bottom case 1104. In some cases, the composite structures have metal layers defining one or more of the exterior surfaces of the composite structure. Thus, for example, the bottom case 1104 may have a metal bottom layer such that the exterior surface of the enclosure is metal. The composite structures may have multiple layers of different materials that together produce desired structural, thermal, or other properties. Further, the layers that define a composite component may not be uniform across the entire component. For example, the thickness of a given layer may be different at different locations of the component (e.g., a top or bottom case). Further, layers may be discontinuous, and multiple different materials may occupy the space of a single layer. Various examples of composite structures are described herein.

Figure 12A:
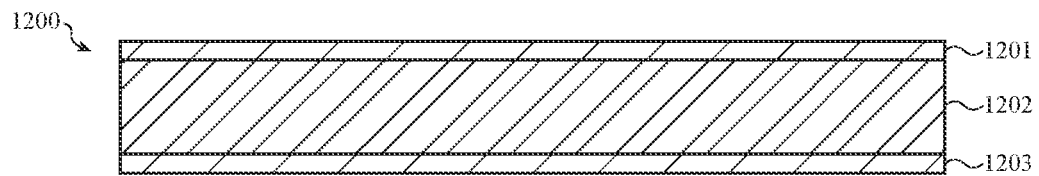
FIGS. 12A-12E depict partial cross-sectional views of a composite structure of the base portion of FIG. 11.

FIG. 12A depicts a cross-sectional view of an example bottom case 1200, which may be an embodiment of the bottom case 1104 in FIG. 11. The cross-sectional view of the bottom case 1200 corresponds to line C-C in FIG. 11. The composite structure of the bottom case 1200 may, however, be used for other layers or components of the enclosures described herein, such as a top case (e.g., the top case 1102 in FIG. 11, or any other top case described herein), a back layer of a display portion (e.g., the back layer 426 in FIG. 4), an enclosure component defining a bottom portion of a tablet computer or smartphone (e.g., the third layer 112, FIG. 2), or the like.

The bottom case 1200 includes a first layer 1201 formed of a metal, a second layer 1202 formed of a different material, and a third layer 1203 formed of a metal. The first and third layers 1201, 1203 may be formed from the same metal or different metals. Example metals include but are not limited to steel, stainless steel, aluminum, magnesium, titanium, metal alloys, and the like.

The second layer 1202 may be formed of a different material than the first and second layers 1201, 1203. For example, the second layer 1202 may be a foam material, which may be an open cell foam or a closed cell foam (or a combination of open and closed cells). The foam material may be formed from or include any material or materials, including, for example, polyurethane foam, polyethylene terephthalate foam, polyvinylchorlide foam, polyisocyanurate foam, reinforced foam (e.g., including a polymer material and reinforcing material such as glass or ceramic fibers), a metal foam, or any other suitable foam material.

In some cases, the second layer 1202 may be a graphite material. For example, the second layer 1202 may be thermoset carbon fiber, thermoplastic carbon fiber, pyrolytic carbon, one or more pre-impregnated sheets or layers of carbon fibers, or the like. Graphite materials may be composites formed of graphite (e.g., in the form of fibers, tows, yarns, woven sheets, or the like) and a polymer matrix (e.g., epoxy, polyester, nylon, or the like). In some cases, the second layer 1202 (or indeed any graphite material layers described herein) may be formed of or include multiple layers of graphite sheets. The combination of first and third layers formed of metal with a second layer formed of foam or graphite (or another material) may exhibit advantageous structural and/or thermal properties as compared to a single metal layer of a similar thickness, for example.

Figure 12B:
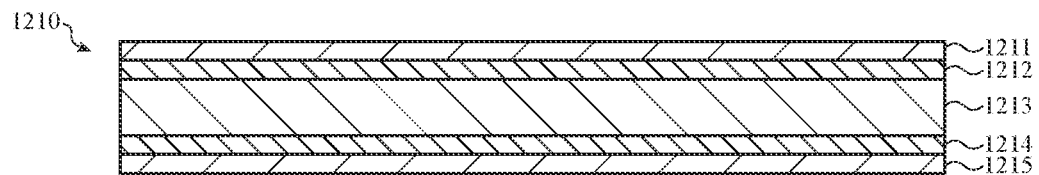

FIG. 12B depicts a cross-sectional view of an example bottom case 1210, which may be an embodiment of the bottom case 1104 in FIG. 11. The cross-sectional view of the bottom case 1210 corresponds to a view along line C-C in FIG. 11. The composite structure of the bottom case 1210 may, however, be used for other layers or components of the enclosures described herein, such as a top case (e.g., the top case 1102 in FIG. 11, or any other top case described herein), a back layer of a display portion (e.g., the back layer 426 in FIG. 4), an enclosure component defining a bottom portion of a tablet computer or smartphone (e.g., the third layer 112, FIG. 2), or the like.

The bottom case 1210 includes a first layer 1211 formed of a metal, a second layer 1212 formed of a polymer material, a third layer 1213 formed of a graphite material, a fourth layer 1214 formed of a polymer material (e.g., the same or a different polymer material as the second layer 1212), and a fifth layer 1215 formed of a metal (e.g., the same or a different metal as the first layer 1211). The metal of the first and fifth layers 1211, 1215 may be any suitable metal, including steel, stainless steel, aluminum, magnesium, titanium, metal alloys, and the like. The polymer material of the second and fourth layers 1212, 1214 may be any suitable polymer material, such as aramid (e.g., woven aramid fibers), nylon, polyethylene, Vectran, or the like. In the case of polymer fibers (e.g., woven aramid), the polymer material may be cured or stiffened using an epoxy or other resin as a matrix. The graphite material of the third layer 1213 may be any suitable graphite material, such as thermoset carbon fiber, thermoplastic carbon fiber, pyrolytic carbon, one or more pre-impregnated sheets or layers of carbon fibers, or the like.

Figure 12C:
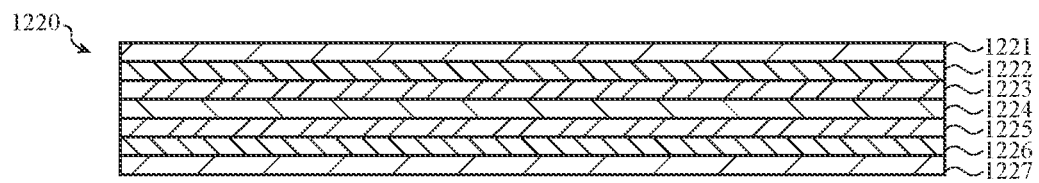

FIG. 12C depicts a cross-sectional view of an example bottom case 1220, which may be an embodiment of the bottom case 1104 in FIG. 11. The cross-sectional view of the bottom case 1220 corresponds to a view along line C-C in FIG. 11. The composite structure of the bottom case 1220 may, however, be used for other layers or components of the enclosures described herein, such as a top case (e.g., the top case 1102 in FIG. 11, or any other top case described herein), a back layer of a display portion (e.g., the back layer 426 in FIG. 4), an enclosure component defining a bottom portion of a tablet computer or smartphone (e.g., the third layer 112, FIG. 2), or the like.

The bottom case 1220 includes a first layer 1221 formed of a metal, a second layer 1222 formed of a polymer material, a third layer 1223 formed of a foam material, a fourth layer 1224 formed of a graphite material, a fifth layer 1225 formed of a foam material (e.g., the same or a different foam material as the third layer 1223), a sixth layer 1226 formed of a polymer material (e.g., the same or a different polymer material as the second layer 1222), and a seventh layer 1227 formed of a metal (e.g., the same or a different metal as the first layer 1221). The particular metal, polymer, foam, and graphite materials used in the bottom case 1220 may be any of the corresponding materials as described above, and are not separately listed here.

Figure 12D:
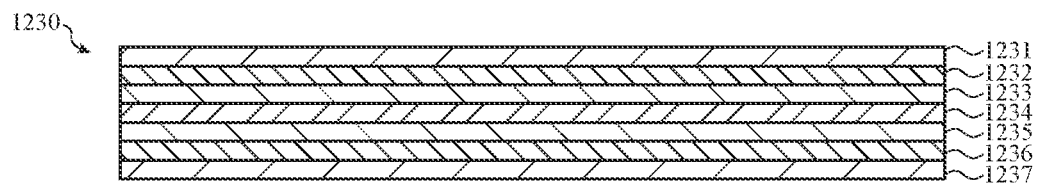

FIG. 12D depicts a cross-sectional view of an example bottom case 1230, which may be an embodiment of the bottom case 1104 in FIG. 11. The cross-sectional view of the bottom case 1230 corresponds to a view along line C-C in FIG. 11. The composite structure of the bottom case 1230 may, however, be used for other layers or components of the enclosures described herein, such as a top case (e.g., the top case 1102 in FIG. 11, or any other top case described herein), a back layer of a display portion (e.g., the back layer 426 in FIG. 4), an enclosure component defining a bottom portion of a tablet computer or smartphone (e.g., the third layer 112, FIG. 2), or the like.

The bottom case 1230 includes a first layer 1231 formed of a metal, a second layer 1232 formed of a polymer material, a third layer 1233 formed of a graphite material, a fourth layer 1234 formed of a foam material, a fifth layer 1235 formed of a graphite material (e.g., the same or a different graphite material as the third layer 1233), a sixth layer 1236 formed of a polymer material (e.g., the same or a different polymer material as the second layer 1232), and a seventh layer 1237 formed of a metal (e.g., the same or a different metal as the first layer 1231). The particular metal, polymer, foam, and graphite materials used in the bottom case 1230 may be any of the corresponding materials as described above, and are not separately listed here.

Figure 12E:
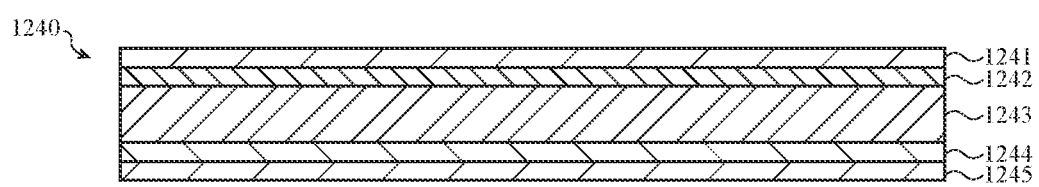

The composite structures in FIGS. 12A-12D have vertically symmetrical layer arrangements. However, composite structures for use in enclosures need not have a vertically symmetrical arrangement. FIG. 12E depicts a cross-sectional view of an example bottom case 1240 that is not vertically symmetric. The bottom case 1240 may be an embodiment of the bottom case 1104 in FIG. 11. The cross-sectional view of the bottom case 1240 corresponds to a view along line C-C in FIG. 11. The composite structure of the bottom case 1240 may, however, be used for other layers or components of the enclosures described herein, such as a top case (e.g., the top case 1102 in FIG. 11, or any other top case described herein), a back layer of a display portion (e.g., the back layer 426 in FIG. 4), an enclosure component defining a bottom portion of a tablet computer or smartphone (e.g., the third layer 112, FIG. 2), or the like.

The bottom case 1240 includes a first layer 1241 formed of a metal, a second layer 1242 formed of a polymer material, a third layer 1243 formed of a foam material, a fourth layer 1244 formed of a graphite material, and a fifth layer 1245 formed of a metal material (e.g., the same or a different metal as the first layer 1241). The particular metal, polymer, foam, and graphite materials used in the bottom case 1240 may be any of the corresponding materials as described above, and are not separately listed here.

The various layers of the composite structures described with respect to FIGS. 12A-12D may have any suitable thickness. In some cases, the overall thickness of the composite structures about one millimeter or less. For example, the overall thickness of a composite material may be about 1.0 mm, 0.9 mm, 0.8 mm, 0.7 mm, 0.6 mm, or 0.5 mm. Each individual layer may have a thickness that is selected based on a desired overall performance or property of the composite material. For example, the in-plane (e.g., horizontal, as shown in FIGS. 12A-12D) thermal conductivity may be greater when there is relatively more graphite than foam in the composite structure. Accordingly, in order to increase the in-plane thermal conductivity, a composite may have a graphite layer that is thicker than a foam layer.

Table 1, below, shows the layer materials and layer thicknesses of four example composite structures that may be used for electronic device enclosures as described herein. These examples may generally correspond to the layer arrangement shown and described with respect to FIG. 12D, and may be vertically symmetric. A layer of zero thickness indicates that that particular material layer may be omitted from the composite structure. (Example 3 may be understood to include two layers of 0.22 mm pyrolytic graphite laminated together, or one layer of 0.44 mm pyrolytic graphite.)

TABLE 1

|  | Example 1 | Example 2 | Example 3 | Example 4 |
| --- | --- | --- | --- | --- |
| Stainless Steel | 0.05 mm | 0.05 mm | 0.05 mm | 0.05 mm |
| Aramid | 0.07 mm | 0.07 mm | 0.07 mm | 0.07 mm |
| Pyrolitic Graphite | 0.17 mm | 0.0 mm | 0.22 mm | 0.12 mm |

TABLE 1-continued

|  | Example 1 | Example 2 | Example 3 | Example 4 |
|---|---|---|---|---|
| Foam | 0.12 mm | 0.46 mm | 0.0 mm | 0.22 mm |
| Pyrolitic Graphite | 0.17 mm | 0.0 mm | 0.22 mm | 0.12 mm |
| Aramid | 0.07 mm | 0.07 mm | 0.07 mm | 0.07 mm |
| Stainless Steel | 0.05 mm | 0.05 mm | 0.05 mm | 0.05 mm |

Table 2, below, shows the layer materials and layer thicknesses of four further example composite structures that may be used for electronic device enclosures as described herein. These examples may generally correspond to the layer arrangement shown and described with respect to FIG. 12E, and may be not vertically symmetric. A layer of zero thickness indicates that that particular material layer may be omitted from the composite structure.

TABLE 2

|  | Example 5 | Example 6 | Example 7 | Example 8 |
|---|---|---|---|---|
| Stainless Steel | 0.05 mm | 0.05 mm | 0.05 mm | 0.05 mm |
| Aramid | 0.07 mm | 0.07 mm | 0.07 mm | 0.07 mm |
| Foam | 0.41 mm | 0.53 mm | 0.0 mm | 0.28 mm |
| Pyrolitic Graphite | 0.12 mm | 0.0 mm | 0.47 mm | 0.25 mm |
| Stainless Steel | 0.05 mm | 0.05 mm | 0.05 mm | 0.05 mm |

The various layers of the composite structures shown in FIGS. 12A-12E may be secured to one another in any suitable way. For example, some or all the layers may be bonded to one another with adhesive or another bonding agent. In some cases, the adhesive or bonding agent may be part of or distributed throughout a given layer. For example, a graphite layer may be impregnated with epoxy or another adhesive or bonding agent, and as such a separate adhesive may not be required to bond the graphite layer with an adjacent layer (e.g., the impregnated epoxy may bond the graphite layer to an adjoining layer while also providing structure to the graphite layer). In some cases, a separate adhesive, epoxy, or bonding agent is applied between two adjacent layers. In some cases, mechanical fastening is used instead of or in addition to adhesives or other bonding agents, such as the mechanical fastening described in FIGS. 16-17D.

The composite structures shown in FIGS. 12A-12E also show the ends of each layer exposed along the side surface of the composite structure. That is, each layer defines part of a side surface of the composite structure. When implemented as a bottom case (or other component) of an electronic device enclosure, these layers may remain exposed, or they may be covered by another material or component. For example, a strip or binding may be applied over some or all of the side surfaces of a composite structure to cover and protect the side surfaces of each individual layer. The strip or binding may be a polymer, ink, paint, film, metal, epoxy, or any other suitable material. In some cases, the composite structure is deformed at the periphery (e.g., by crimping, rolling, or the like) so that the side surfaces of the individual layers are not exposed, as described with respect to FIGS. 18A and 18C.

While the cross-sectional views in FIGS. 12A-12E show the composite structures in one particular orientation, this orientation is merely for illustration, and the composite structures may be rotated or flipped in any given implementation. Further, either exterior layer of a given composite structure may be used to define an exterior surface of an enclosure. For example, if the composite structure shown in FIG. 12E were used as a top case, the first layer 1241 may define the top exterior surface of the top case. Alternatively, the composite structure may be flipped so that the fifth layer 1245 defines the top exterior surface of the top case.

Figure 13:
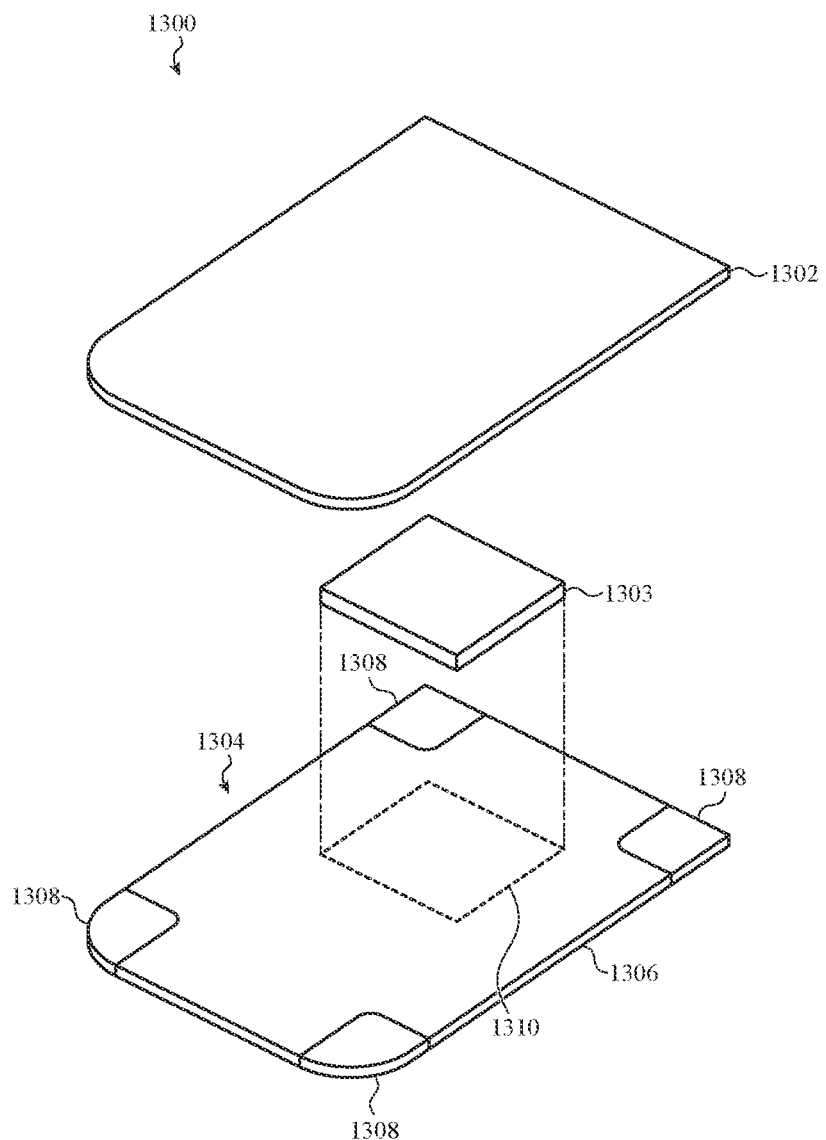
FIG. 13 depicts a partial exploded view of an example base portion for an electronic device.

As noted above, the layers of a composite structure as described herein need not be uniform over their entire area. FIG. 13 shows an exploded view of part of a base portion 1300 of a device, including an intermediate layer 1302 (e.g., a circuit board), a bottom case 1304 that is formed of a composite material having different layer configurations at different locations, and a processor 1303 (or other heat generating component) which may be attached to the intermediate layer 1302 and thermally coupled to the bottom case 1304.

The bottom case 1304 may include several different regions, including a main region 1306, reinforced regions 1308, and a thermal region 1310. The main region 1306 may have multiple layers, and may take the form of any of the composite structures described above with respect to FIGS. 12A-12E. The reinforced regions 1308 may include reinforcing materials that increase the strength, toughness, stiffness, or other property of the composite structure in those regions. The reinforced regions 1308 may be formed by increasing the thickness of one or more layers of the composite structure (while optionally decreasing or removing other layers). For example, if the main region 1306 has a composite structure corresponding to the bottom case 1200 in FIG. 12A, the second layer 1202, which may be foam in the main region 1306, may be replaced with carbon fiber in the reinforced regions 1308. Similarly, in the thermal region 1310, the foam may be replaced with graphite or copper (or another material with a higher thermal conductivity than foam). The graphite or copper in the thermal region 1310 may help conduct heat away from the processor 1303 (or other heat generating component), which may help cool the processor 1303.

In some cases, instead of replacing all of a layer of material with another material, as described above, one or more layers may be added to (or omitted from) the composite structure in that area. For example, instead of replacing all of the foam with carbon fiber in the reinforced regions 1308, the foam layer may be half as thick as the foam in the main region 1306, and the carbon fiber may occupy the remaining space left available by the use of the thinner foam.

Figure 14:
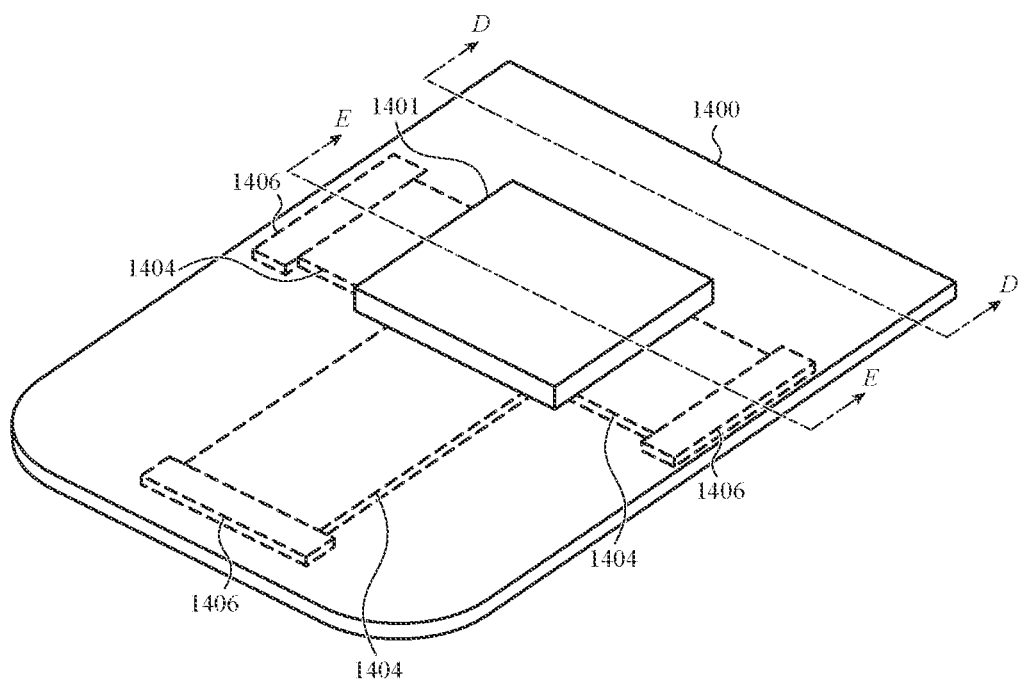
FIG. 14 depicts a partial exploded view of an example base portion for an electronic device.

FIG. 14 shows another example bottom case 1400 that uses a non-uniform layer arrangement to facilitate the extraction of heat from a processor 1401 (or other heat generating component). As shown in FIG. 14, the processor 1401 is thermally coupled to the bottom case 1400, though it may be electrically coupled to a circuit board or other component that may be positioned above the bottom case 1400. As shown in greater detail in FIGS. 15B-15C, the bottom case 1400 may include thermal conduits 1404 within the composite structure. The thermal conduits 1404 may conduct heat from the processor 1401 to heat sinks 1406, which may also be positioned within or otherwise integrated with the composite structure. The thermal conduits 1404 may be formed of or include any suitable material, such as graphite, copper, aluminum, steel, metal alloys, composite materials, or the like. In some cases, the material of the thermal conduits 1404 may be selected to have a thermal conductivity that draws heat away from the processor 1401 to the heat sinks 1406 at a sufficient rate to facilitate effective cooling of the processor 1401 (or other heat generating component).

Figure 15A:
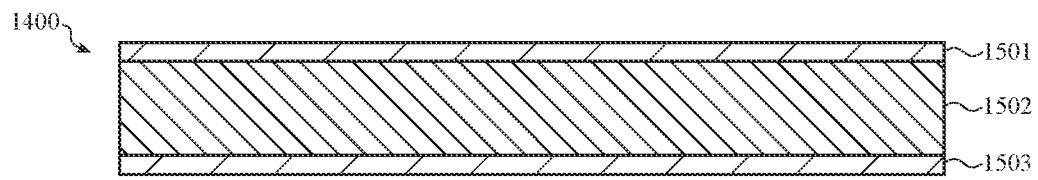
FIGS. 15A-15C depict partial cross-sectional views of a composite structure of the base portion of FIG. 14.

FIG. 15A depicts a cross-sectional view of the bottom case 1400, viewed along line D-D in FIG. 14. The bottom case 1400 includes a first layer 1501, a second layer 1502, and a third layer 1503. For simplicity, the bottom case 1400 is shown as having only three layers, though the bottom case 1400 may use any suitable composite structure, such as any of the composite structures described herein. As shown, the first layer 1501 may be a metal, the second layer 1502 may be a foam, and the third layer 1503 may be a metal (e.g., the same or a different metal as the first layer 1501). In this region of the bottom case 1400, the first, second, and third layers 1501, 1502, 1503 extend fully (and uniformly) from one side of the bottom case 1400 to an opposite side of the bottom case 1400.

Figure 15B:
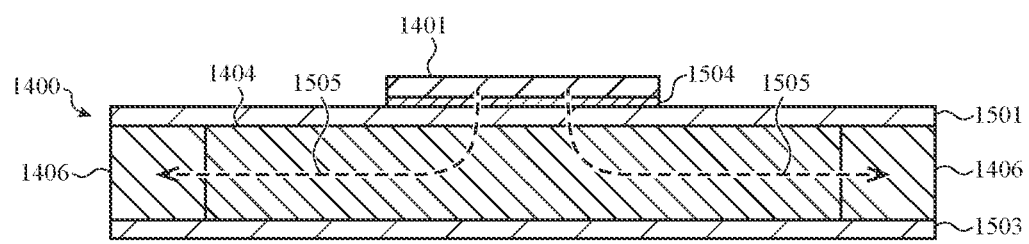

FIG. 15B depicts a cross-sectional view of the bottom case 1400, viewed along line E-E in FIG. 14. This view shows the structure of the bottom case 1400 in the area where the thermal conduits 1404 and the heat sinks 1406 are positioned. The processor 1401 may be thermally coupled to the first layer 1501, such as by directly contacting the first layer 1501 or via a bonding material 1504 (e.g., a thermal paste, adhesive, epoxy, copper layer, etc.). In this region, all or some of the material of the second layer 1502 may be replaced with a material with a higher thermal conductivity (or having any particular thermal properties, including lower thermal conductivity, anisotropic thermal conductivity profiles, and the like). For example, where the second layer 1502 is a foam material, some or all of the foam material may be replaced with graphite, copper, gold, aluminum, or another thermally conductive material, to form the thermal conduits 1404. The thermal conduits 1404 may be thermally coupled to the heat sinks 1406, and may thus conduct heat away from the processor 1401 and towards the heat sinks 1406, as illustrated by arrows 1505, where the heat may be expelled from the device. The heat sinks 1406 may be any suitable type of heat sink or thermal mass. For example, the heat sinks 1406 may be vapor chambers, metals or other materials or components with a high heat capacity (e.g., gold, iron, fluid vessels with water or ammonia or other fluids), structures with heat-exchanging fins, or the like. The thermal conduits 1404 and the heat sinks 1406 may assist in cooling the processor 1401, and may also help distribute heat produced by the processor 1401 more evenly throughout the bottom case 1400. For example, the composite structure of the bottom case 1400 may have a thermal conductivity profile that results in greater through-plane heat conduction (e.g., in the vertical direction as shown in FIG. 15B) than in-plane heat conduction (e.g., in the horizontal direction as shown in FIG. 15B). This may result in the area of the bottom case 1400 that is directly below the processor 1401 becoming too hot. By conducting the heat to more remote parts of the bottom case 1400, the heat may be more evenly distributed, thus producing a more even temperature profile along the bottom case 1400.

Figure 15C:
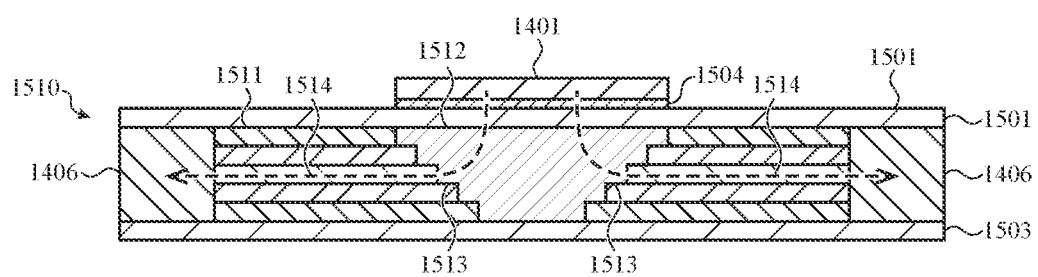

FIG. 15C depicts a cross-sectional view of another example bottom case 1510, which may be an embodiment of the bottom case 1400 in FIG. 14. The cross-sectional view of the bottom case 1510 corresponds to a view along line E-E in FIG. 14. The bottom case 1510 may include a laminated graphite second layer 1511 that defines the thermal conduits within the bottom case 1510. The laminated graphite second layer 1511 may define stepped profiles 1513 in the area underneath or near the processor 1401, which may aid in the transfer of heat into the layers of graphite. For example, heat may be more readily conducted into the graphite layers of the laminated graphite second layer 1511 through the ends of the layers, rather than through the primary surfaces of the layers (e.g., the top and bottom surfaces, as illustrated in FIG. 15C). Accordingly, the stepped profiles 1513 may expose the ends of the graphite layers to improve the transfer of heat into the graphite second layer 1511.

The bottom case 1510 may also include a conductive mass 1512 that is thermally coupled to the processor 1401 (e.g., via the first layer 1501 and the optional bonding material 1504) and to the ends of the graphite layers of the laminated graphite second layer 1511. More particularly, the conductive mass 1512 may have complementary stepped profiles that correspond to and/or mate with the stepped profiles 1513 of the laminated graphite second layer 1511. The conductive mass 1512 may thus conduct heat away from the processor 1401, through the conductive mass 1512, and into the laminated graphite second layer 1511 via the ends of the layers of graphite (as illustrated by arrow 1514). The conductive mass 1512 may be formed of any suitable thermally conductive material, such as metal (e.g., copper, gold, silver, aluminum, etc.), thermally conductive polymers, or the like.

Figure 16:
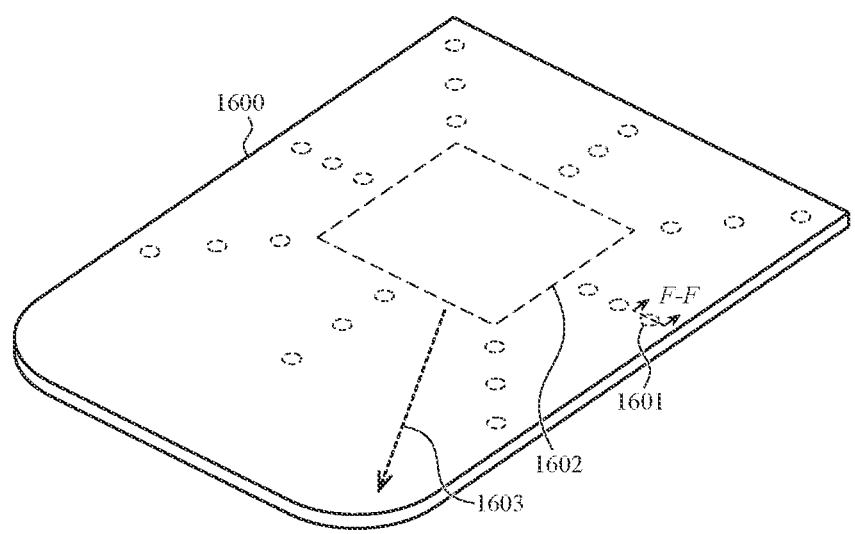
FIG. 16 depicts an example composite structure for a base portion of an electronic device.

The composite structures described herein may be formed of multiple layers that are adhered or otherwise bonded together. In some cases, instead of or in addition to adhesive between adjacent layers, the layers of the composite structures described herein are secured together using other fastening structures. FIG. 16 depicts an example bottom case 1600, formed from a composite structure, that has fastening structures (e.g., a fastening structure 1601) that secure the layers of the composite structure together, alone or in conjunction with adhesives. The fastening structures may help improve physical properties of the composite structure (and thus the bottom case 1600 or any other component in which the composite structure is used), such as flexural rigidity, tensile stiffness, toughness, resistance to shear deformations, and the like.

In some cases, the fastening structures may reduce or otherwise affect the thermal conductivity of the bottom case 1600, especially along a transverse direction (e.g., in-plane, when the bottom case 1600 defines a plane or a planar region). Accordingly, in cases where the bottom case 1600 is used to conduct and/or dissipate heat from a processor or other heat generating component, the fastening structures may be arranged to define one or more thermal passages (e.g., a thermal passage 1603) extending from a heat-generating component region 1602 towards a periphery of the bottom case 1600. The thermal passages may be substantially or entirely free of fastening structures along a linear path from the heat-generating component region 1602 to a peripheral side of the bottom case 1600. In some cases, the thermal passages extend radially from the heat-generating component region 1602 towards the peripheral side of the bottom case 1600.

Figure 17A:
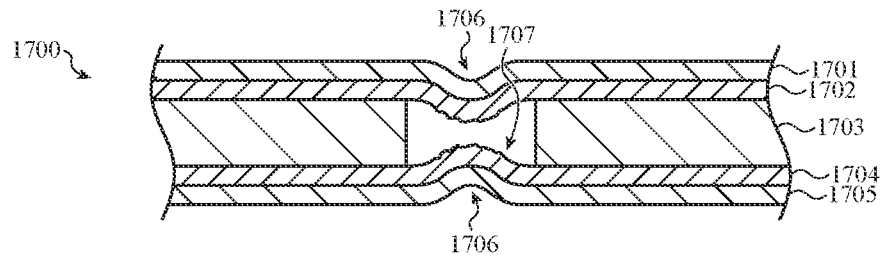
FIGS. 17A-17E depict partial cross-sectional views of the composite structure of FIG. 16.

The fastening structures may take several different forms. FIGS. 17A-17D depict bottom cases having various different fastening structure configurations. For example, FIG. 17A depicts a partial cross-sectional view of a bottom case 1700, which may be an embodiment of the bottom case 1600 in FIG. 16. The cross-sectional view of the bottom case 1700 corresponds to a view along line F-F in FIG. 16. Further, while the fastening structure of the bottom case 1700 is shown in conjunction with a composite structure having a particular arrangement of layers, the same fastening structure may be used for any composite structure described herein, such as those shown and described with respect to FIGS. 12A-12E.

The bottom case 1700 includes a first layer 1701 formed of a metal, a second layer 1702 formed of a polymer, a third layer 1703 formed of a foam or graphite, a fourth layer 1704 formed of a polymer (e.g., the same or a different polymer as the second layer 1702), and a fifth layer 1705 formed of a metal (e.g., the same or a different metal as the first layer 1701). Any of these layers may include or be replaced by multiple sub-layers. For example, a third layer 1703 formed of graphite may include multiple sub-layers of graphite. As another example, the third layer 1703 may include multiple sub-layers of foam and graphite.

The bottom case 1700 also includes a fastening structure 1706 (e.g., an embodiment of the fastening structure 1601). The fastening structure 1706 includes an opening 1707 (or a recess) in the third layer 1703 (which may itself include multiple layers), and portions of the second and fourth layers 1702, 1704 extending into the opening 1707. For example, the second and fourth layers 1702, 1704 may be formed of or include a polymer material (e.g., an aramid fabric) pre-impregnated or otherwise incorporated with a resin or other adhesive or bonding agent. When forming the bottom case 1700, a force may be applied to the second and fourth layers 1702, 1704 to force some of the polymer and/or bonding agent into the opening 1707. In some cases, the force may be applied to the second and fourth layers 1702, 1704 directly, and then additional layers may be added to the second and fourth layers 1702, 1704. In other cases, the force is applied to the second and fourth layers 1702, 1704 through other layers, such as where the first and fifth layers 1701, 1705 are applied prior to forming the fastening structure. By having the polymer and/or bonding agent extend into the opening 1707, the polymer and the third layer 1703 define an interlocking structure (e.g., the polymer and the layer at least partially overlap one another) that aids in maintaining the lateral or in-plane positions of the layers in the bottom case 1700. This may result in a bottom case with increased flexural rigidity, tensile stiffness, toughness, resistance to shear deformations or strains, or the like.

Figure 17B:
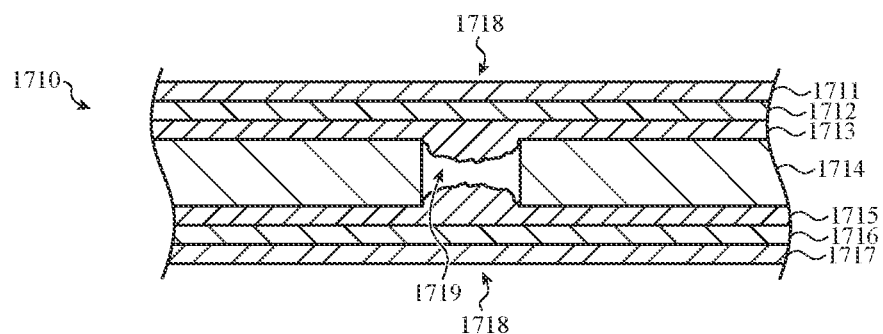

FIG. 17B depicts a partial cross-sectional view of a bottom case 1710, which may be an embodiment of the bottom case 1600 in FIG. 16, and which includes another example fastening structure. The cross-sectional view of the bottom case 1710 corresponds to a view along line F-F in FIG. 16. Further, while the fastening structure of the bottom case 1710 is shown in conjunction with a composite structure having a particular arrangement of layers, the same fastening structure may be used for nay composite structure described herein, such as those shown and described with respect to FIGS. 12A-12E.

The bottom case 1710 includes a first layer 1711 formed of a metal, a second layer 1712 formed of a polymer, a third layer 1713 formed of a resin or other adhesive or bonding agent, a fourth layer 1714 formed of a foam or graphite, a fifth layer 1715 formed of a resin or other adhesive or bonding agent (e.g., the same or a different resin as the third layer 1713), a sixth layer 1716 formed of a polymer (e.g., the same or a different polymer as the second layer 1712), and a seventh layer 1717 formed of a metal (e.g., the same or a different metal as the first layer 1711). The bottom case 1710 also includes a fastening structure 1718 (e.g., an embodiment of the fastening structure 1601). The fastening structure 1718 includes an opening 1719 (or a recess) in the fourth layer 1714 (which may itself include multiple layers), and portions of the third and fifth layers 1713, 1715 extending into the opening 1719. For example, the third and fifth layers 1713, 1715 may be formed of or include a resin, adhesive, or other bonding agent that is used to secure the second and sixth layers 1712, 1716 (which may be a polymer material such as an aramid fabric) to adjacent layers, and optionally to act as a matrix for the second and sixth layers 1712, 1716. When forming the bottom case 1710, a force may be applied to the composite structure to force some of the resin into the opening 1719, or the resin may otherwise be caused to flow into the opening 1719. In some cases, the force may be applied to the second and fourth layers 1712, 1714 directly, and then additional layers may be added to the second and fourth layers 1712, 1714. In other cases, the force is applied to the second and fourth layers 1712, 1714 through other layers, such as where the first and fifth layers 1711, 1715 are applied prior to forming the fastening structure. By having the resin extend into the opening 1719, the resin and the fourth layer 1714 define an interlocking structure that aids in maintaining the lateral or in-plane positions of the layers in the bottom case 1710. This may result in a bottom case with increased flexural rigidity, tensile stiffness, toughness, resistance to shear deformations, or the like.

Figure 17C:
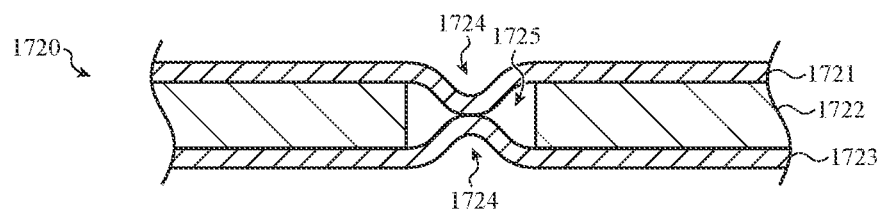

FIG. 17C depicts a partial cross-sectional view of a bottom case 1720, which may be an embodiment of the bottom case 1600 in FIG. 16, and which includes another example fastening structure. The cross-sectional view of the bottom case 1720 corresponds to a view along line F-F in FIG. 16. Further, while the fastening structure of the bottom case 1720 is shown in conjunction with a composite structure having a particular arrangement of layers, the same fastening structure may be used for nay composite structure described herein, such as those shown and described with respect to FIGS. 12A-12E.

The bottom case 1720 includes a first layer 1721 formed of a metal, a second layer 1722 formed of a foam or graphite, and a third layer 1723 formed of a metal (e.g., the same or a different metal as the first layer 1721). Of course, as noted above, the bottom case 1720 may include more or different layers than those shown in FIG. 17C. The bottom case 1720 also includes a fastening structure 1724 (e.g., an embodiment of the fastening structure 1601). The fastening structure 1724 may be formed by deforming the first and third layers 1721, 1723 to force part of the material of the first and third layers 1721, 1723 into an opening 1725 in the second layer 1722. In some cases, the deformed portions of the first and third layers 1721, 1723 are welded or otherwise fused together within the opening 1725. In such cases, the first and third layers 1721, 1723 may be spot welded, laser welded (e.g., after the deformed regions are formed), diffusion bonded, or the like. By having the deformed portions of the first and third layers 1721, 1723 extend into the opening 1725, the first and third layers 1721, 1723 and the second layer 1722 define an interlocking structure that aids in maintaining the lateral or in-plane positions of the layers in the bottom case 1720. This may result in a bottom case with increased flexural rigidity, tensile stiffness, toughness, resistance to shear deformations, or the like.

Figure 17D:
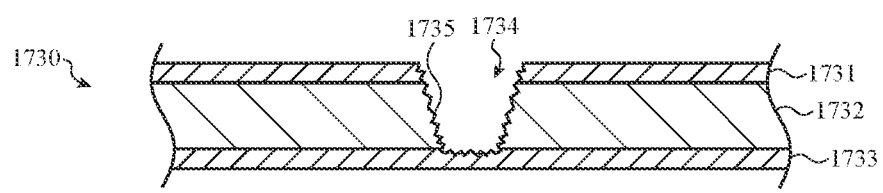

FIG. 17D depicts a partial cross-sectional view of a bottom case 1730, which may be an embodiment of the bottom case 1600 in FIG. 16, and which includes another example fastening structure. The cross-sectional view of the bottom case 1730 corresponds to a view along line F-F in FIG. 16. Further, while the fastening structure 1734 of the bottom case 1730 is shown in conjunction with a composite structure having a particular arrangement of layers, the same fastening structure may be used for nay composite structure described herein, such as those shown and described with respect to FIGS. 12A-12E.

The bottom case 1730 includes a first layer 1731 formed of a metal, a second layer 1732 formed of graphite (optionally including multiple sub-layers of graphite), and a third layer 1733 formed of a metal (e.g., the same or a different metal as the first layer 1731). Of course, as noted above, the bottom case 1730 may include more or different layers than those shown in FIG. 17D.

In order to form the fastening structure 1734 (e.g., an embodiment of the fastening structure 1601), a laser beam, plasma beam, or other heating or machining process may be used to form a cavity in the bottom case 1730 and at least partially fuse the ends of the various layers together. For example, by directing a laser beam onto the bottom case 1730, a cavity may be formed that extends through the metal of the first layer 1731, through at least part of the second layer 1732 (which may be formed of multiple sub-layers of graphite), and optionally into the third layer 1733. The heat of the laser (or other type of beam or implement) may cause some of the metal of the first layer 1731 to form a fused surface 1735 along the recess. The fused surface 1735 may be formed from essentially only the metal that is ablated from the first layer 1731. In other cases, the fused surface 1735 may be a mixture of the metal that is ablated from the first layer 1731 and the material (e.g., graphite) of the second layer 1732. In yet other cases, the process of forming the fastening structure 1734 results in the ends of the individual sub-layers of graphite fusing directly together (e.g., without substantial integration of metal from the first layer 1731). The fused surface 1735 may help secure the various layers of the bottom case 1730 together, thus aiding in maintaining the lateral or in-plane positions of the layers in the bottom case 1730. This may result in a bottom case with increased flexural rigidity, tensile stiffness, toughness, resistance to shear deformations, or the like.

Figure 17E:
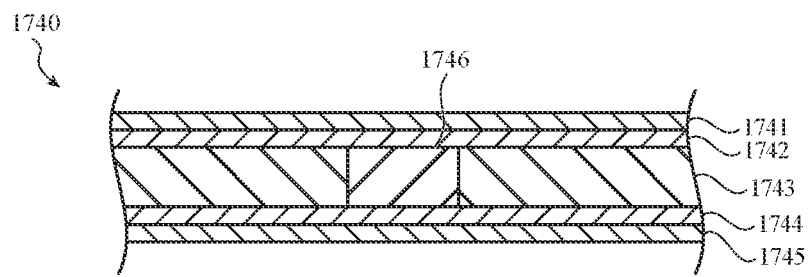

FIG. 17E depicts a partial cross-sectional view of a bottom case 1740, which may be an embodiment of the bottom case 1600 in FIG. 16, and which includes another example fastening structure. The cross-sectional view of the bottom case 1740 corresponds to a view along line F-F in FIG. 16. Further, while the fastening structure of the bottom case 1740 is shown in conjunction with a composite structure having a particular arrangement of layers, the same fastening structure may be used for nay composite structure described herein, such as those shown and described with respect to FIGS. 12A-12E.

The bottom case 1740 includes a first layer 1741 formed of a metal, a second layer 1742 formed of a polymer, a third layer 1743 formed of a foam or graphite, a fourth layer 1744 formed of a polymer (e.g., the same or a different polymer as the second layer 1742), and a fifth layer 1745 formed of a metal (e.g., the same or a different metal as the first layer 1741). The bottom case 1740 also includes an interstitial member 1746 positioned in an opening in the third layer 1743. While the opening is shown as being defined in only one layer, the opening may extend through other layers as well, including any of the layers shown in FIG. 17E, or other layers that may be included in other embodiments.

The interstitial member 1746 may be any suitable material or combinations of materials. For example, the interstitial member 1746 may be a metal component, such as a metal plate, cylinder, or other component. In other examples, the interstitial member 1746 may be a plastic or polymer, ceramic, alloy, composite, foam, adhesive, or any other suitable material. The interstitial member 1746 may itself be an adhesive that is positioned in the opening during lamination of the bottom case 1740 and then cured. Once cured, the interstitial member 1746 may bond to the second, third, and fourth layers 1742, 1743, 1744, thereby securing the layers together.

In some cases an adhesive or other bonding agent bonds the interstitial member 1746 to the layers of the bottom case 1740. The adhesive or other bonding agent may be included in the opening and/or on the interstitial member 1746 when the interstitial member 1746 is positioned in the opening. In some cases, an adhesive or other bonding agent may be applied between the second layer 1742 and the third layer 1743 (and between the third layer 1743 and the fourth layer 1744), in which case that same adhesive may help secure the interstitial member 1746 and maintain it in position.

The interstitial member 1746 may provide stiffness, strength, or toughness to the bottom case 1740, for example, by making it more difficult for adjacent layers to slide or shear with respect to one another (e.g., the interstitial member 1746 may increase the shear strength of the bottom case 1740). In some cases, the interstitial member 1746 may act as a thermal conduit to help improve the thermal conductivity of the bottom case 1740. In such cases, the interstitial member 1746 may be formed of a metal or other material that has a greater thermal conductivity than the bottom case 1740 as a whole (or greater than the material of other layers, such as the third layer 1743).

Figure 18A:
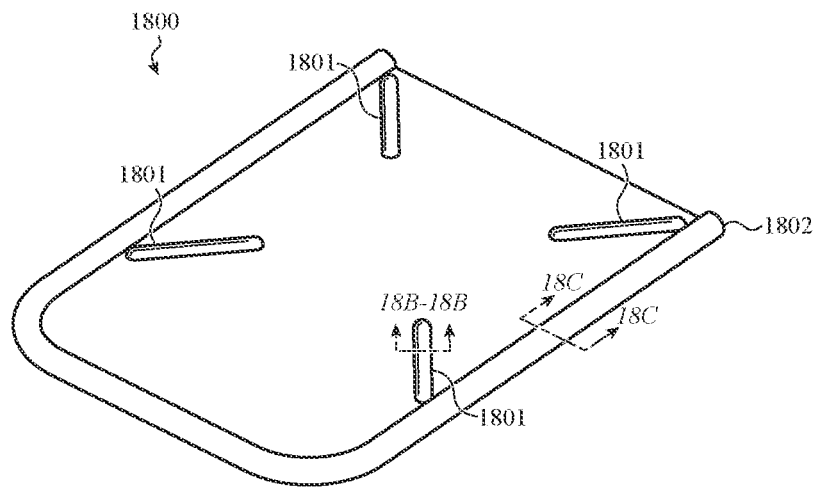
FIG. 18A depicts an example composite structure for an electronic device.
Figure 18B:
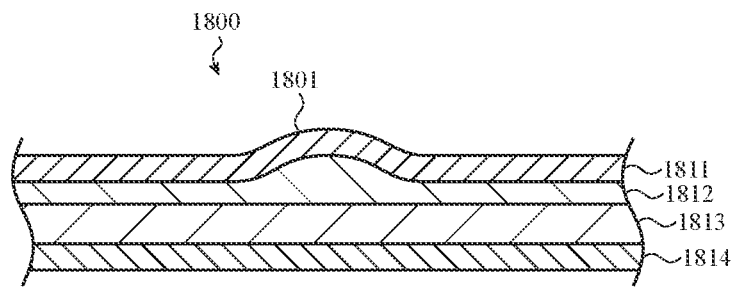
FIGS. 18B-18G depict partial cross-sectional views of the composite structure of FIG. 18A.
Figure 18C:
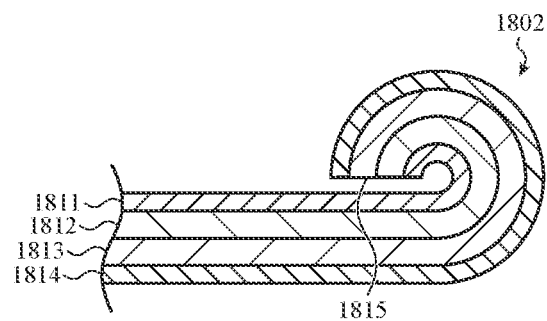

In some cases, bottom cases (or other components) formed from the composite structures described herein are substantially planar and define featureless (e.g., flat) surfaces. In other cases, however, composite structures may include integrated features such as ribs, recesses, channels, posts, bosses, and the like. FIGS. 18A-18C illustrate examples of features that may be formed in a bottom case formed of a composite structure.

FIG. 18A depicts an example bottom case 1800 that includes shaped features, including ribs 1801 and a rolled edge 1802. The ribs 1801 and the rolled edge 1802 may increase the stiffness, strength, rigidity, or other physical property of the bottom case 1800. The rolled edge 1802 may also position the end surfaces of the various layers of the bottom case 1800 so that they are not exposed along the side surface of the bottom case 1800. This may help protect the layers from delamination or other damage.

FIG. 18B depicts a partial cross-sectional view of the bottom case 1800, as viewed along line G-G in FIG. 18A. The bottom case 1800 may include a first layer 1811 formed of metal, a second layer 1812 formed of a polymer material, a third layer 1813 formed of a foam or graphite, and a fourth layer 1814 formed of a metal (e.g., the same or a different metal as the first layer 1811). Of course, the bottom case 1800 may include more or different layers than those shown in FIG. 18B. The rib 1801 is formed into to the first layer 1811, and may be formed by molding, pressing, forging, hydroforming, machining, or any other suitable technique. As shown, the rib 1801 defines a convex feature along the top exterior surface of the first layer 1811, and a concave feature along the interior surface of the first layer 1811 (e.g., the surface that is opposite the top exterior surface). Some of the material of the second layer 1812 may extend into the concave feature (e.g., into the rib 1801) in order to improve the strength, stiffness, rigidity, or other property of the rib 1801, or the bottom case 1800 more generally. As noted above, a polymer layer may include a polymer fiber and an epoxy, resin, adhesive, or other curing agent. Accordingly, the material of the second layer 1812 that extends into the concave feature may be the polymer fiber, the epoxy (or other curing agent), or a combination of both materials. The material of the second layer 1812 may extend into the concave feature in response to a force being applied on the first layer 1811 prior to the second layer 1812 becoming cured. In some cases, an adhesive is used between the first layer 1811 and the second layer 1812 (e.g., in addition to or instead of a resin matrix that is integrated with the polymer fibers), and the adhesive may extend into the concave feature in a manner similar to that shown in FIG. 18B.

FIG. 18C depicts a partial cross-sectional view of the bottom case 1800, as viewed along line H-H in FIG. 18A, showing details of the rolled edge 1802. As noted above, a rolled edge may position the end surfaces of the layers of the bottom case 1800 so that they are facing (and optionally touching) a main surface of the bottom case 1800, or are otherwise not exposed to the external environment where they may be susceptible to damage. As shown in FIG. 18C, all of the layers 1811-1814 of the composite structure are rolled or deformed so that the ends 1815 of the layers are facing the top surface of the first layer 1811. In other cases, the layers may be rolled in the opposite direction, such that the ends 1815 are facing the fourth layer 1814. Other shapes and configurations may be used instead of or in addition to the rolled configuration shown in FIG. 18C, including folds, crimps, pinched ends, or the like. Indeed, any shape or configuration that positions the ends of the layers so that they are not exposed to the external environment during normal operating use of a device may be used.

Figure 18D:
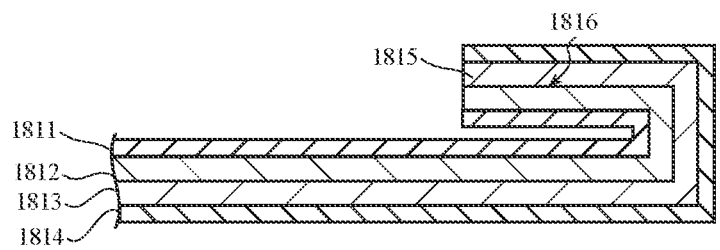

FIG. 18D depicts a partial cross-sectional view of the bottom case 1800, showing another example of a rolled edge 1816 that may be formed in the bottom case 1800. As shown in FIG. 18D, all of the layers 1811-1814 of the composite structure are folded, crimped, bent, or otherwise formed so that the ends 1815 of the layers are not facing the top surface of the first layer 1811 (e.g., resembling a single fold hem).

Figure 18E:
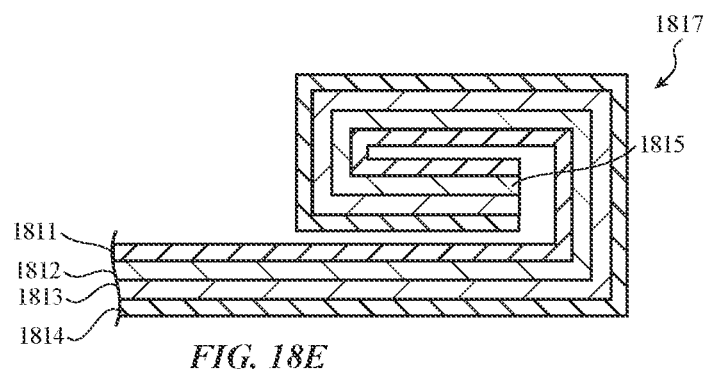

FIG. 18E depicts a partial cross-sectional view of the bottom case 1800, showing another example of a rolled edge 1817 that may be formed in the bottom case 1800. As shown in FIG. 18E, all of the layers 1811-1814 of the composite structure are folded, crimped, bent, or otherwise formed so that the ends 1815 of the layers are facing a folded portion of the bottom case 1800 (e.g., resembling a double fold hem).

Figure 18F:
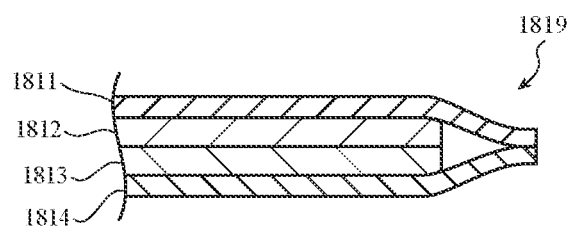

FIG. 18F depicts a partial cross-sectional view of the bottom case 1800, showing an example of a crimped edge 1819 that may be formed in the bottom case 1800. As shown in FIG. 18F, the first and fourth layers 1811, 1814 may extend beyond the second and third layers 1812, 1813, and the free ends of the first and fourth layers 1811, 1814 may be crimped together. The crimped ends may be secured together (e.g., via adhesive, weldments, fasteners, rivets, or the like), or they may simply be in contact with one another. Where the first and fourth layers 1811, 1814 are formed from a metal or other plastically deformable material, the crimped ends may retain their deformed shape after crimping.

Figure 18G:
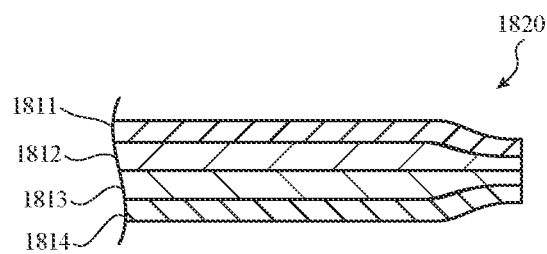

FIG. 18G depicts a partial cross-sectional view of the bottom case 1800, showing another example of a crimped edge 1820 that may be formed in the bottom case 1800. As shown in FIG. 18G, instead of the first and fourth layers 1811, 1814 extending beyond the second and third layers 1812, 1813, the first through fourth layers may all extend to the end of the bottom case, and all of the layers may be subjected to a crimping or deforming operation. In some cases, one or more layers of the bottom case 1800 are at least partially crushed, or otherwise thinned, due to the crimping, such as the second and third layers 1812, 1813 (as illustrated in FIG. 18G). The crushed or thinned layers may be formed from a material that can be crushed or otherwise thinned during the crimping operation, such as a foam, composite, honeycomb, or the like. The crimped ends may be secured together (e.g., via adhesive, weldments, fasteners, rivets, or the like), or they may simply be in contact with one another. Where the first and fourth layers 1811, 1814 are formed from a metal or other plastically deformable material, the crimped ends may retain their deformed shape after crimping.

In some cases, the edges of a bottom case, such as the bottom case 1800, may be both crimped (as in FIGS. 18F-18G) and rolled or hemmed (as in FIGS. 18C-18E). This may reduce the size of the rolled edge (relative to an un-crimped rolled edge), as the thickness of the portion being rolled or hemmed may be reduced relative to a main portion of the bottom case 1800.

Figure 19A:
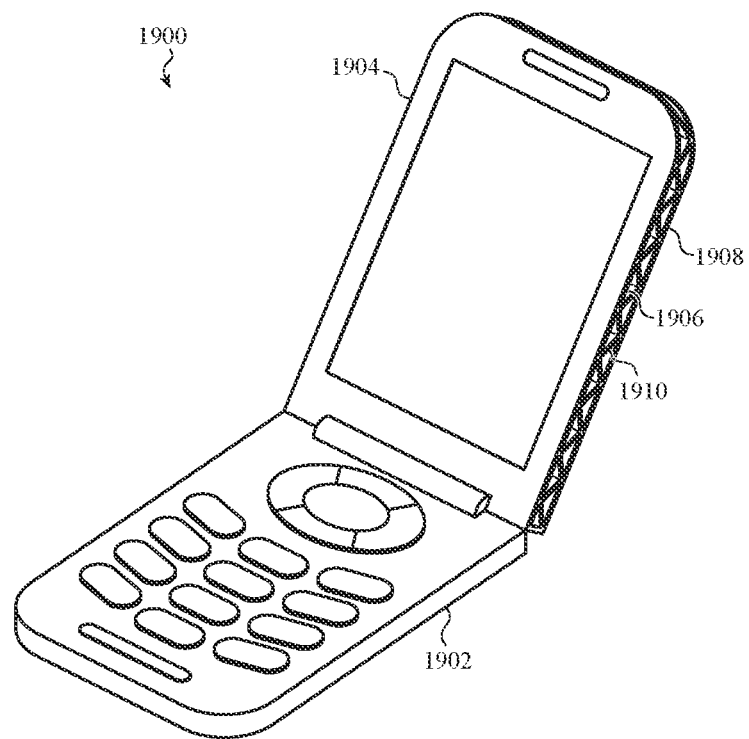
FIGS. 19A-19B depict an example electronic device with a composite structure.
Figure 19B:
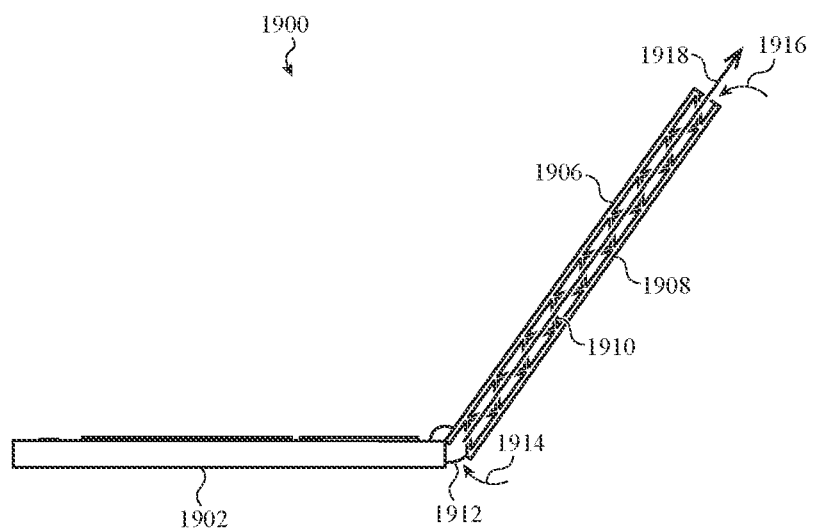

As described above, composite structures may facilitate cooling of electronic device components. For example, composite materials may be configured with thermal conduits, thermally conductive materials, heat sinks, and other materials, structures, and features that help remove and/or dissipate heat. FIGS. 19A-19B depict an example electronic device that uses composite structures to facilitate cooling. For example, FIG. 19A depicts an example electronic device 1900 that includes a composite structure integrated into a display portion to facilitate cooling of a display or other components of the electronic device. The device 1900 resembles a clamshell-style phone that has a display portion 1904 and a base portion 1902 flexibly or rotatably coupled to the display portion 1904. The device 1900 may be an embodiment of other otherwise resemble other devices described herein, such as the device 400. Accordingly, details of such devices are equally applicable to the device 1900 and will not be repeated here.

The display portion 1904 includes a front member 1906, a back member 1908, and an air-permeable structure 1910. The front and back members 1906, 1908 may be any suitable materials and/or components, and may be single monolithic structures, or assemblies. For example, the front member 1906 may include a display, a cover, one or more housing components, and so on. The back member 1908 may be metal, plastic, a composite or laminate material, an assembly having multiple components, or the like.

The air-permeable structure 1910 may be any suitable structure, such as a series of rods, filaments, shaped (e.g., corrugated) sheets, fibers, an open-cell foam, or the like, that extend between the front member 1906 and the back member 1908. The rods, filaments, fibers, foam, or shaped sheets may be formed from or include any suitable material, such as carbon fiber, polymer, metal, ceramic, polymer, composite materials, or the like. The air-permeable structure 1910 may structurally and at least semi-rigidly couple the back member 1908 to the front member 1906. For example, the air-permeable structure 1910 may be sufficiently rigid to prevent substantial movement or flexing of the back member 1908 relative to the front member 1906 during normal use of the device 1900.

The permeability of the air-permeable structure 1910 may allow air to flow through the structure to facilitate cooling of the device 1900. For example, as shown in FIG. 19B, which is a side view of the device 1900 of FIG. 19A, air may enter one end of the air-permeable structure 1910 (e.g., at arrow 1914) and pass through the air-permeable structure 1910, exiting at another location (e.g., as shown by arrow 1918). The air flow may be due to natural convection or forced air (e.g., from a fan). In the latter case, a fan may be included in the display portion 1904 or the base portion 1902 and configured to direct air flow through the air-permeable structure 1910.

The air-permeable structure 1910 may be configured to assist in cooling the display portion 1904 or the base portion 1902 (or components within or otherwise coupled to the display or base portion). In order to move heat from the base portion 1902 to the air-permeable structure 1910, the device 1900 may include a thermally conductive conduit 1912 that extends from the base portion 1902 to the display portion 1904 and thermally couples one or more heat generating components within the base portion 1902 to the air-permeable structure 1910 (or near the air-permeable structure 1910). The thermally conductive conduit 1912 transfers heat from the base portion 1902 to the display portion 1904 so that it can be removed via the airflow through the air-permeable structure 1910.

The air-permeable structure 1910 may be shaped or otherwise configured so that air can flow through the structure in one or more directions. For example, the structure may allow air flow from a bottom of the display portion 1904 (e.g., proximate the hinge that joins the base portion 1902 and the display portion 1904) to the top of the display portion 1904. Arrows 1914 and 1916 illustrate this passage. In some cases, instead of or in addition to allowing flow from the bottom to the top of the display portion 1094, the air-permeable structure 1910 allows air flow in a perpendicular direction (e.g., into the page relative to FIG. 19B). In some cases, air can flow through the air-permeable structure 1910 in substantially any direction that is parallel to a plane defined by the front and/or back members 1906, 1908 of the display portion 1904.

As noted above, the instant application describes enclosures or device constructions in which side surfaces of functional components of the device (e.g., components providing more functionality than merely forming a housing or enclosure) are used to define distinct portions of a laminated side surface of the enclosure. While such constructions are shown using certain layers or components, it will be understood that more, fewer, or different layers than those shown herein may be used. Additional components that may be used in various types of devices that may form portions of the layered side surface of a device include, but are not limited to, shielding layers (e.g., metal or conductive films, foils, meshes, etc.), membranes, fabrics, coloring layers (e.g., inks, dyes, paints, etc.), lenses, image sensors, antennas (e.g., radiating structures of antennas), electrical insulators (e.g., plastics, foams, rubbers, glass, or other dielectric components), adhesives, and the like. Such layers may be positioned in any suitable position and to achieve various desired functions in the device in addition to forming part of an exterior surface of the device. Further, the foregoing examples describe a construction of a device (or a device enclosure) using various types of handheld electronic devices as example devices. However, as noted above, the concepts described herein may be used for other types of devices as well. For example, a layered device enclosure may be used for tablet computers, watches (e.g., smart watches), smartphones, desktop computers, notebook computers, displays, head-mounted displays, and the like.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above and below, or their synonyms, do not necessarily refer to an absolute position relative to an external reference, but instead refer to the relative position of components with reference to the figures.

What is claimed is:

1. An electronic device comprising:
an enclosure formed of a plurality of layers cooperating to define an interior volume, comprising:
 a first layer formed of a first glass material and defining:
  a user input surface of the enclosure; and
  a first portion of a side surface of the enclosure;
 a second layer formed of a first material, the second layer positioned below the first layer and defining a second portion of the side surface of the enclosure;
 a third layer formed of a second material different from the first material, the third layer positioned below the second layer and defining a third portion of the side surface of the enclosure; and
 a fourth layer formed of a second glass material and positioned below the third layer, the fourth layer defining:
  a bottom surface of the enclosure; and
  a fourth portion of the side surface of the enclosure.

2. The electronic device of claim 1, further comprising a display positioned below the first layer and configured to produce graphical outputs visible through a transparent region of the first layer.

3. The electronic device of claim 2, further comprising a touch-sensing system configured to detect touch inputs applied to the user input surface of the enclosure.

4. The electronic device of claim 3, wherein the fourth layer is formed of a second glass material different from the first glass material.

5. The electronic device of claim 1, wherein the electronic device further comprises:
 a fifth layer defining a fifth portion of the side surface of the enclosure; and
 a sixth layer defining a sixth portion of the side surface of the enclosure.

6. The electronic device of claim 1, wherein the side surface defines a curved surface extending from the first layer to the fourth layer.

7. The electronic device of claim 6, wherein the first layer, the second layer, the third layer, and the fourth layer each define a respective curved portion of the curved surface.

8. The electronic device of claim 1, wherein:
the first layer is adhered to the second layer; and
the second layer is adhered to the third layer.

9. An electronic device comprising:
a top layer defining:
 a top exterior surface of the electronic device; and
 a first portion of a side exterior surface of the electronic device;
a first intermediate layer positioned below the top layer and secured to the top layer, the first intermediate layer defining a second portion of the side exterior surface of the electronic device;
a second intermediate layer positioned below the first intermediate layer and secured to the first intermediate layer, the second intermediate layer defining a third portion of the side exterior surface of the electronic device; and
a bottom layer positioned below the second intermediate layer and defining:

a bottom exterior surface of the electronic device; and a fourth portion of the side exterior surface of the electronic device.

10. The electronic device of claim 9, wherein the top layer, the first intermediate layer, the second intermediate layer, and the bottom layer cooperate to define an interior volume of the electronic device.

11. The electronic device of claim 10, wherein:

the electronic device further comprises an electronic assembly within the interior volume and having a non-planar side profile; and the first intermediate layer and the second intermediate layer cooperate to define a non-planar interior wall of the interior volume that conforms to the non-planar side profile of the electronic assembly.

12. The electronic device of claim 9, wherein:

the top layer is formed of a first transparent material; and the bottom layer is formed of a second transparent material.

13. The electronic device of claim 12, further comprising:

a display positioned below the top layer and configured to produce graphical outputs visible through a transparent region of the top layer; and a touch-sensing system configured to detect touch inputs applied to the top exterior surface of the electronic device.

14. The electronic device of claim 9, wherein the first, second, and third portions of the side exterior surface extend around an entire periphery of the electronic device.

15. The electronic device of claim 9, wherein the second intermediate layer is secured to the bottom layer.

16. An electronic device comprising:

a top case formed of a first transparent material and defining:

a top exterior surface of the electronic device; and a first portion of a side exterior surface of the electronic device;

a first intermediate layer, having a first width, positioned below the top case and defining:

a second portion of the side exterior surface of the electronic device; and a first portion of an interior wall of the electronic device;

a second intermediate layer, having a second width different than the first width, positioned below the first intermediate layer and defining:

a third portion of the side exterior surface of the electronic device; and a second portion of the interior wall of the electronic device; and a bottom case formed of a second transparent material and defining:

a bottom exterior surface of the electronic device; and a fourth portion of the side exterior surface of the electronic device.

17. The electronic device of claim 16, wherein the top case, the first intermediate layer, the second intermediate layer, and the bottom case cooperate to define an interior volume of the electronic device.

18. The electronic device of claim 17, wherein:

the second width is greater than the first width; and the second intermediate layer defines a ledge extending into the interior volume of the electronic device.

19. The electronic device of claim 18, further comprising a component of the electronic device coupled to the ledge within the interior volume of the electronic device.

20. The electronic device of claim 16, wherein:

the top exterior surface of the electronic device defines an input surface of the electronic device; and at least one of the first intermediate layer or the second intermediate layer is metal.

* * * * *